US010756909B2

(12) United States Patent
Condeixa et al.

(10) Patent No.: US 10,756,909 B2
(45) Date of Patent: Aug. 25, 2020

(54) SYSTEMS AND METHODS FOR SELF AND AUTOMATED MANAGEMENT OF CERTIFICATES IN A NETWORK OF MOVING THINGS, FOR EXAMPLE INCLUDING A NETWORK OF AUTONOMOUS VEHICLES

(71) Applicant: Veniam, Inc., Mountain View, CA (US)

(72) Inventors: Tiago Silvestre Condeixa, Aveiro (PT); Dário Fernando Rodrigues Nascimento, Lisbon (PT); João Manuel Ferreira Gomes, Cacém (PT)

(73) Assignee: VENIAM, INC., Mountain View, CA (US)

( * ) Notice: Subject to any disclaimer, the term of this patent is extended or adjusted under 35 U.S.C. 154(b) by 199 days.

(21) Appl. No.: 15/787,933

(22) Filed: Oct. 19, 2017

(65) Prior Publication Data

US 2018/0159693 A1    Jun. 7, 2018

Related U.S. Application Data

(60) Provisional application No. 62/430,634, filed on Dec. 6, 2016.

(51) Int. Cl.
*H04L 9/32*   (2006.01)
*H04L 29/06*  (2006.01)
(Continued)

(52) U.S. Cl.
CPC ........ *H04L 9/3268* (2013.01); *H04L 63/0823* (2013.01); *H04W 4/38* (2018.02); *H04W 4/40* (2018.02); *H04L 63/101* (2013.01)

(58) Field of Classification Search
CPC . H04L 9/3268; H04L 63/0823; H04L 63/101; H04W 4/40; H04W 4/38
See application file for complete search history.

(56) References Cited

U.S. PATENT DOCUMENTS

| 7,840,812 B1* | 11/2010 | Levenberg | .......... H04L 63/0823 713/150 |
| 2002/0188869 A1* | 12/2002 | Patrick | ................ G06F 21/6245 726/4 |

(Continued)

OTHER PUBLICATIONS

"Understanding Public Key Infrastructure (PKI)", Copyright 1999, RSA Data Security, Inc., 7 pages. Retrieved from ftp://ftp.rsa.com/pub/pdfs/understanding_pki.pdf on Sep. 7, 2017.

(Continued)

*Primary Examiner* — Khoi V Le
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). More specifically, systems and methods for self and automated management of certificates in a network of moving things that may include autonomous vehicles.

15 Claims, 18 Drawing Sheets

(51) Int. Cl.
H04W 4/40 (2018.01)
H04W 4/38 (2018.01)

(56) References Cited

U.S. PATENT DOCUMENTS

| | | | | |
|---|---|---|---|---|
| 2004/0049675 | A1* | 3/2004 | Micali | G06Q 20/02 |
| | | | | 713/158 |
| 2006/0129817 | A1* | 6/2006 | Borneman | G06F 21/41 |
| | | | | 713/170 |
| 2007/0103294 | A1* | 5/2007 | Bonecutter | G08B 21/10 |
| | | | | 340/539.18 |
| 2011/0191581 | A1* | 8/2011 | Shim | H04L 67/12 |
| | | | | 713/158 |
| 2013/0019093 | A1* | 1/2013 | Seidl | H04L 63/0823 |
| | | | | 713/158 |
| 2015/0318996 | A1* | 11/2015 | van Roermund | H04L 9/006 |
| | | | | 713/158 |
| 2019/0090174 | A1 | 3/2019 | Rocci et al. | |

OTHER PUBLICATIONS

"Red Flat Certificate System 8.0: Deployment Guide, Edition 8.0.5, Section 5.2: Defining the Certificate Authority Hierarchy," Copyright 2009, Red Flat, Inc., 3 pages. Retrieved from https://access.redhat.com/documentation/en-US/Red_Hat_Certificate_System/8.0/html/Deployment_Guide/sect-Deployment_Guide-Planning_Your_CRTS-Arranging_the_Certificate_Authority_Hierarchy.html on Sep. 7, 2017.

* cited by examiner

SYSTEMS AND METHODS FOR SELF AND AUTOMATED MANAGEMENT OF CERTIFICATES IN A NETWORK OF MOVING THINGS, FOR EXAMPLE INCLUDING A NETWORK OF AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/430,634, filed on Dec. 6, 2016, and titled "Systems and Methods for Self and Automated Management of Certificates in a Network of Moving Things, for Example Including a Network of Autonomous Vehicles," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
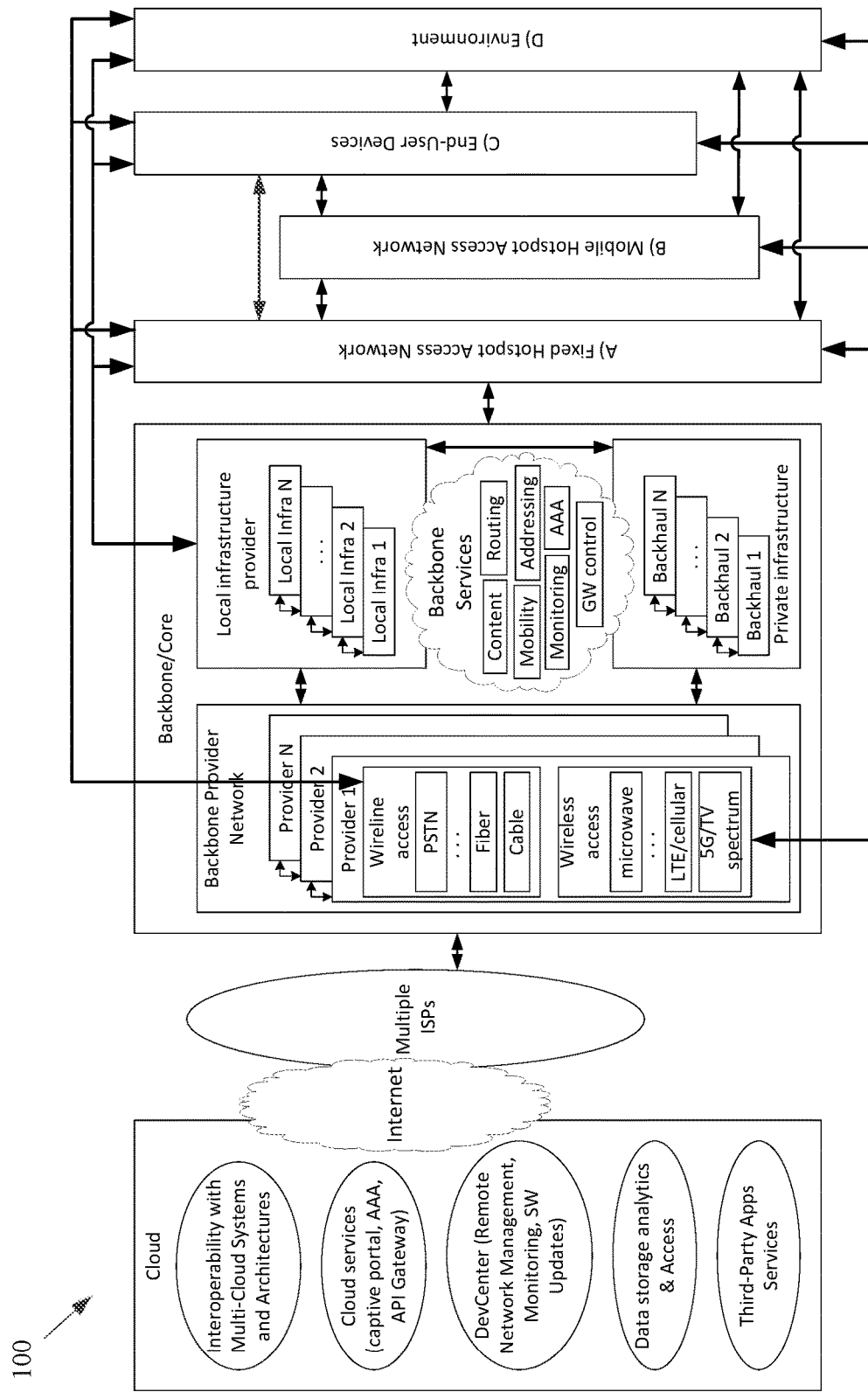
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
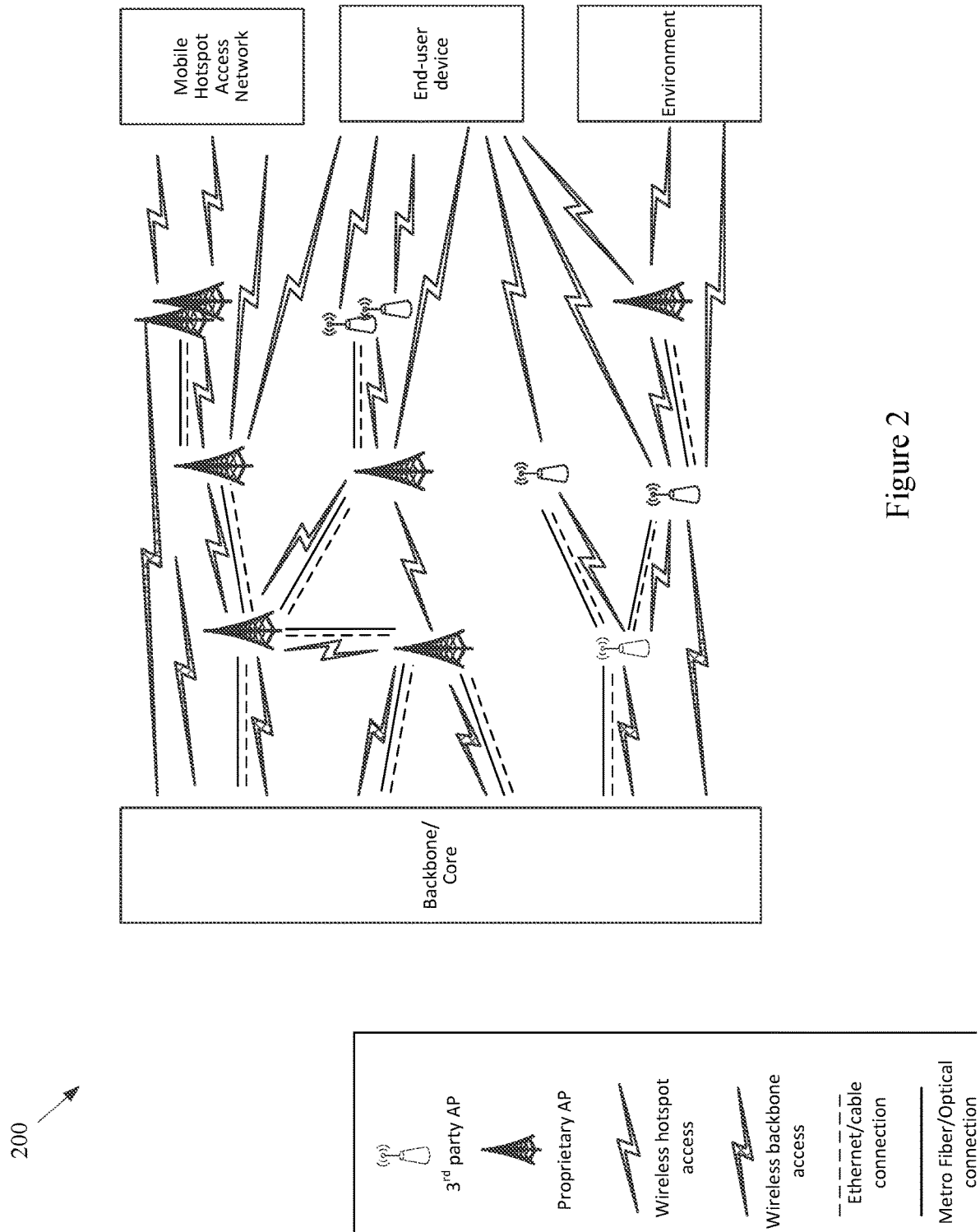
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
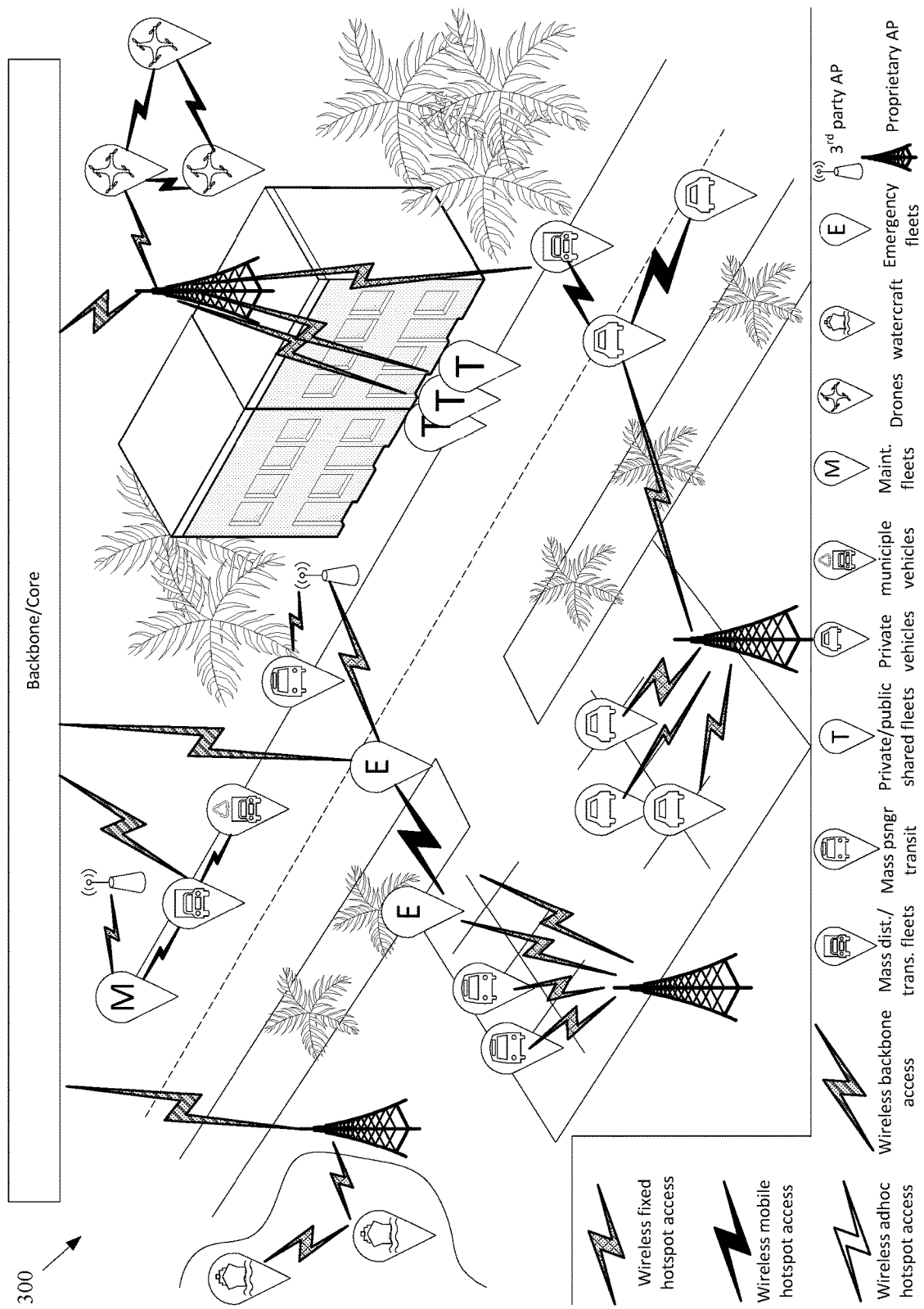
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
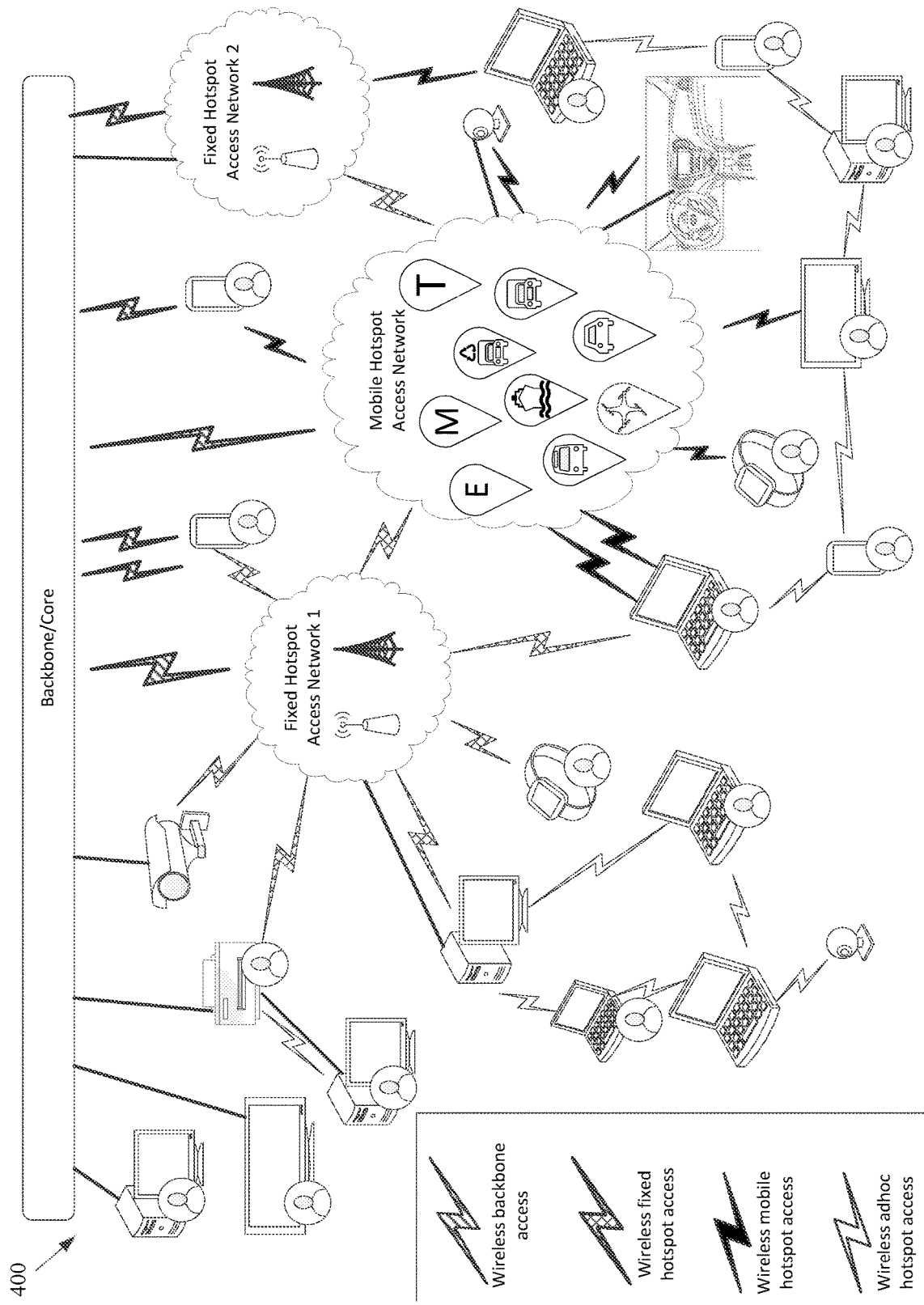
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
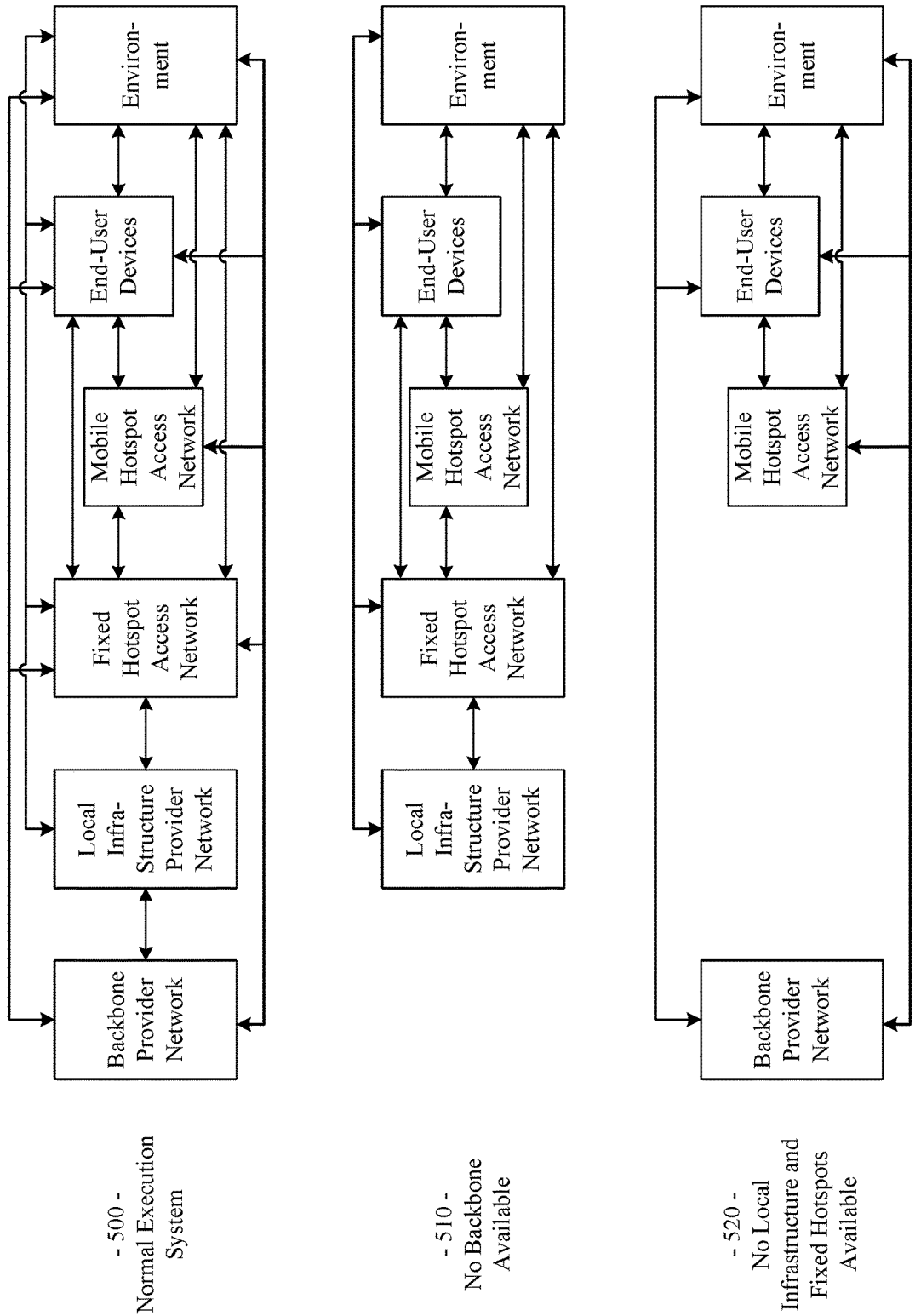
FIGS. 5A-5C show a plurality of network configurations illustrating the flexibility and/or and resiliency of a communication network, in accordance with various aspects of this disclosure.
Figure 5B:
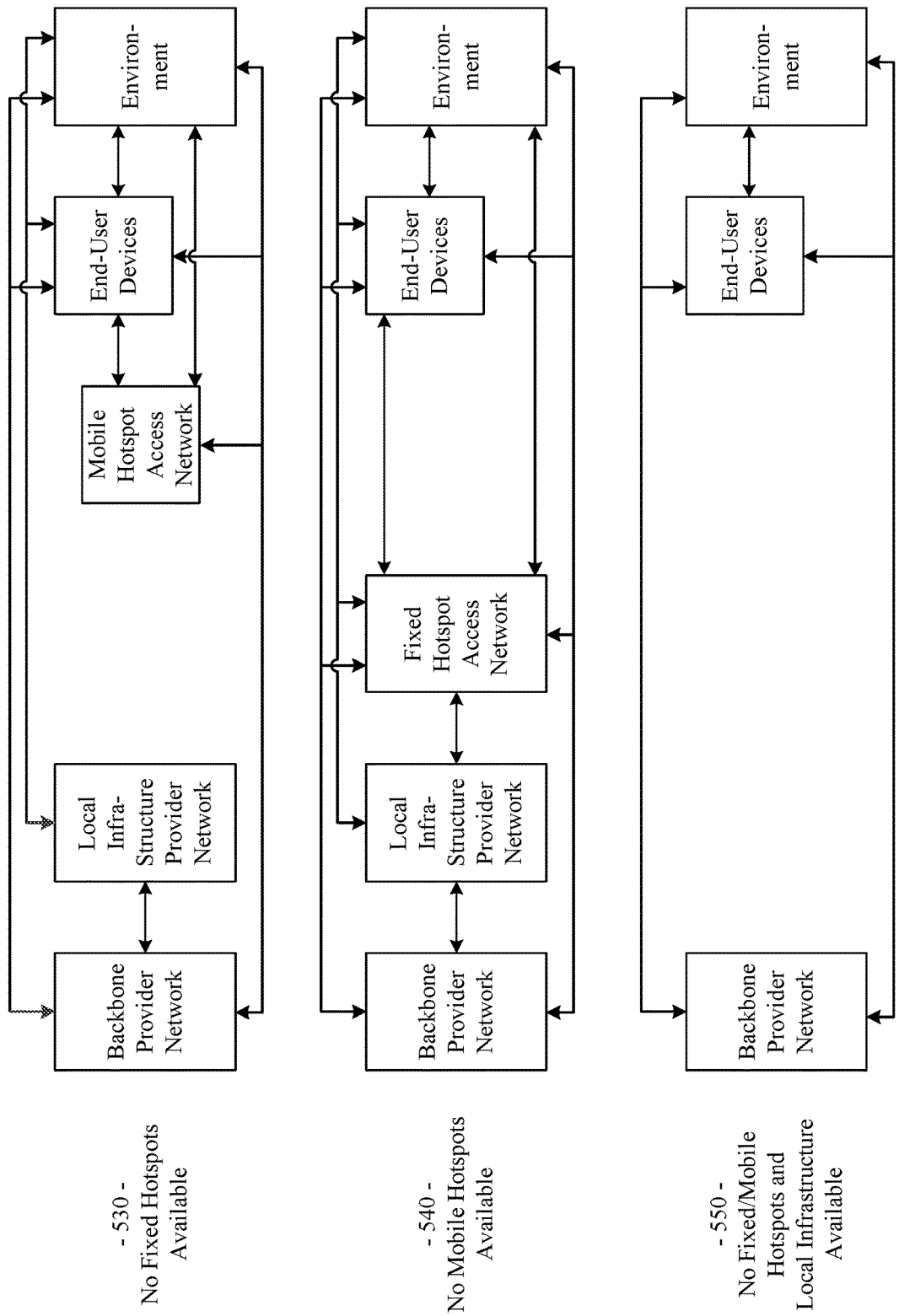
Figure 5C:
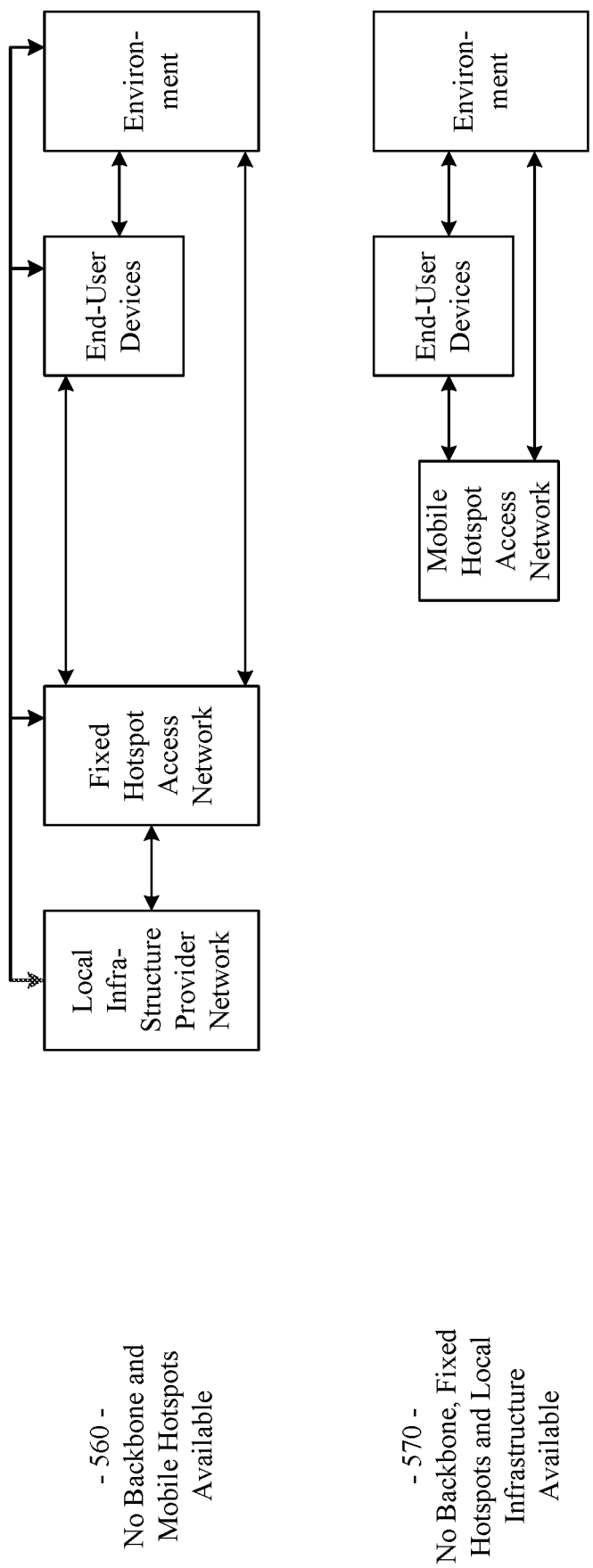

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
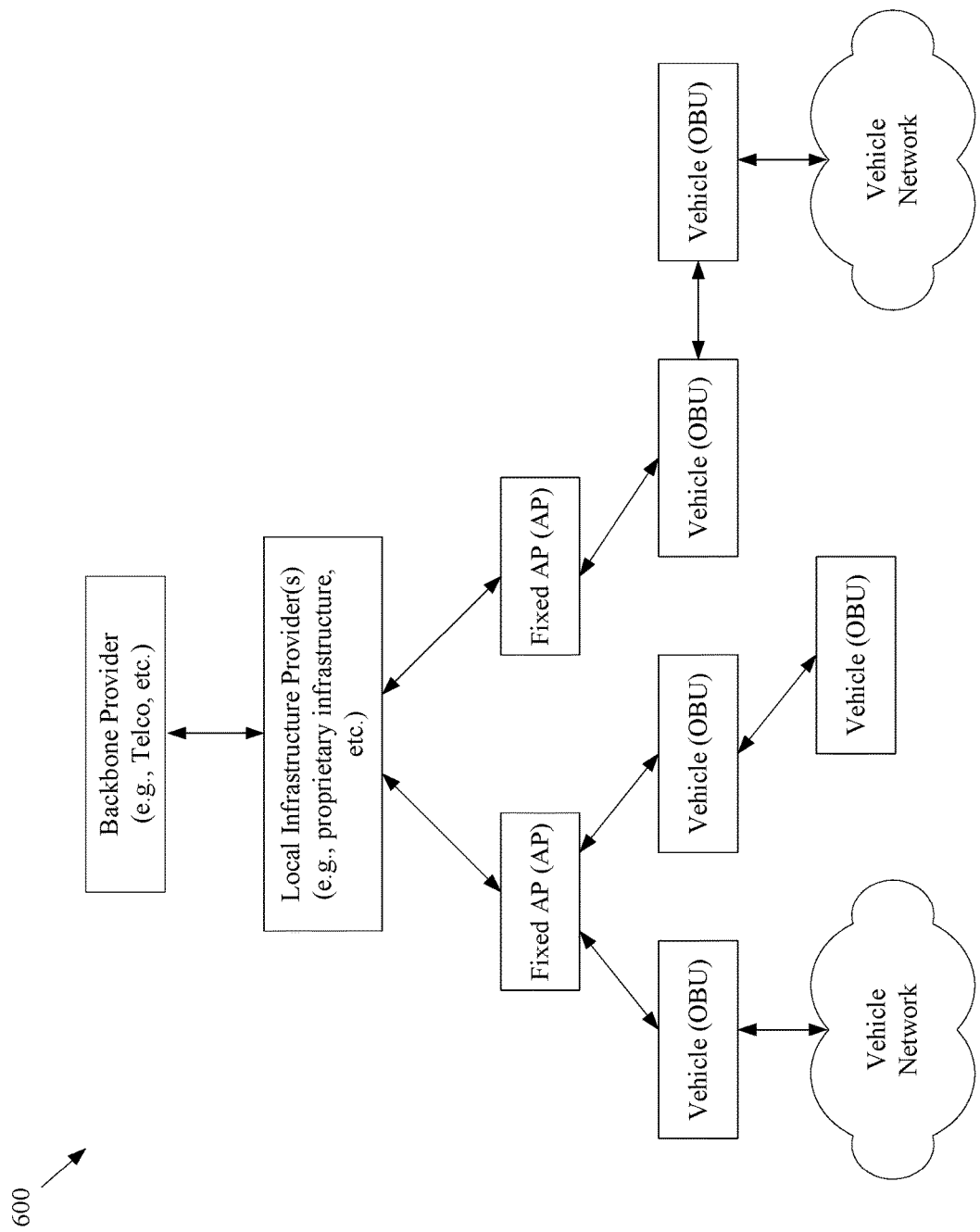
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

A network of moving things in accordance with various aspects of the present disclosure may employ a scalable and dynamic system that supports authentication, authorization, and accounting (AAA), to enable the network to have control over network nodes that use mobile and intermittent networks, services, and resources. The present disclosure is focused primarily on the functionalities and mechanisms related to Authentication.

In accordance with various aspects of the present disclosure, each device of a network of moving things may be any network node with connectivity such as, for example, a mobile AP, a fixed AP, a system of an autonomous vehicle, etc., the operation of which may involve the use of what may be referred to herein as "restricted resources." Restricted resources may include such things as, for example, access to the Internet, access to multimedia content, and/or access to information about the vehicle in which the network node is located. Such information may be accessible from a provider, and those devices wishing to access such information may be identified and certified by, for example, a certification authority (CA) of a public key infrastructure (PKI). Because a network in accordance with aspects of the present invention may be used to collect huge amounts of information, it is important that unauthorized devices not be able to introduce falsified data into the system and compromise the decisions and analytics provided. It is also important to block access to data by any device not having valid identification and authorization.

Thus, it is important that a network of moving things have a certification system that enables it to manage autonomous devices (e.g., network nodes that may or may not be carried by humans) in a dynamic and scalable way. Solutions are currently available that provide what are referred to herein as "digital certificates" or just "certificates" to devices carried and directly managed by humans, where the process of having and renewing a certificate employs manual procedures from the entities involved. Such solutions are difficult to scale for use in a network of moving things such as that described herein, where the network comprises autonomous nodes in a self-management mode, each with different context information and different requirements. Processes for management of such certificate information individually and manually, without taking into account the context information about each device/user, is not suitable for use in a network of moving things such as is described herein. The assignment of certificates to network nodes and devices, whether new or updated, may involve the assignment of expiration date(s), signature algorithm(s), and subject in order to provide better management of the PKI, and all of the restricted resources, access to which involve certificates (e.g., network devices having limited resources that may need to upload data infrequently may use certification with simple algorithms, small amounts of data, and short durations).

A certification system in accordance with various aspects of the present disclosure is dynamic and flexible, enabling a set of heterogeneous devices to access various network elements (e.g., network nodes) and different types of data and services. The certificates used in such a system may not be provided with infinite expiration dates, in order to control the number of recognized network devices (e.g., fixed and/or mobile APs, network controllers, etc.), and such certificates may be easily managed without the need to revoke access to large numbers of network devices that have been compromised, destroyed, or whose owner has changed. Such a system may, for example, employ a list of revoked network devices (e.g., a publicly accessible list) that is updated each time a network device certified by that system is marked as not able to be trusted.

The amount of time that a particular network device (e.g., a network node such as a fixed AP, a mobile AP, a network controller (NC), etc.) continues to have access to controlled resources after the particular network device has been compromised or stolen includes, for example, the time it takes to detect the comprised state of the particular network device, plus the time it takes to distribute an update of what is referred to herein as a certificate revocation list (CRL) to all network devices that share any resource(s) with the particular network device, to revoke access by the particular device to the various resources, services, network devices, etc. It will be recognized that it is important that detection of such a compromise and dissemination of such an updated CRL to all network devices certified by a certification authority of a PKI be completed as quickly as possible, to disable access to information by third-parties that are not permitted (i.e., not certified or authorized) to access the information.

A certification system in accordance with various aspects of the present disclosure is prepared to support a network of moving things (e.g., an Internet of moving things), where there is a need to certify and provide different access to different types of network devices (e.g., fixed APs, mobile APs, network controllers, etc.) based on their specific context information such as, for example, the probability of theft of the network device and/or intrusion into operation of the network device, the type(s) of connectivity (e.g., communication technologies) in use, the geographic location of the network device, previous interactions with the network device, and the owner/operator of the network device.

Aspects of the present disclosure include a set of mechanisms to deal with the management of certificates in a network of moving things (e.g., an Internet of moving things), which may include such things as, for example, autonomous vehicles and other network devices that are self-managing, and whose operation does not involve human intervention/management on a daily basis. In such networks, it is important to have mechanisms that perform self-management of certificates, including renovation, retrieval, and sharing of updated revocation list(s) from the available certificate authorities (CAs) of the network infrastructure. The mechanisms support a dynamic and distributed strategy for management of the CAs, as well as to provide the integration of the certificates with a delay tolerant communication system, to enable static sensors and other network devices with limited Internet access to be able to use the CA system. The set of mechanisms may include, for example, aspects to address the use of certificate authorities distributed at various locations in the network, the self-management of certificates by network nodes, the operation of certificate authorities located in mobile network nodes, the integration of certificate management within a delay-tolerant network (DTN), and the dissemination of certificate revocation lists. Additional details of the above mechanisms are described in the following sections.

Figure 7:
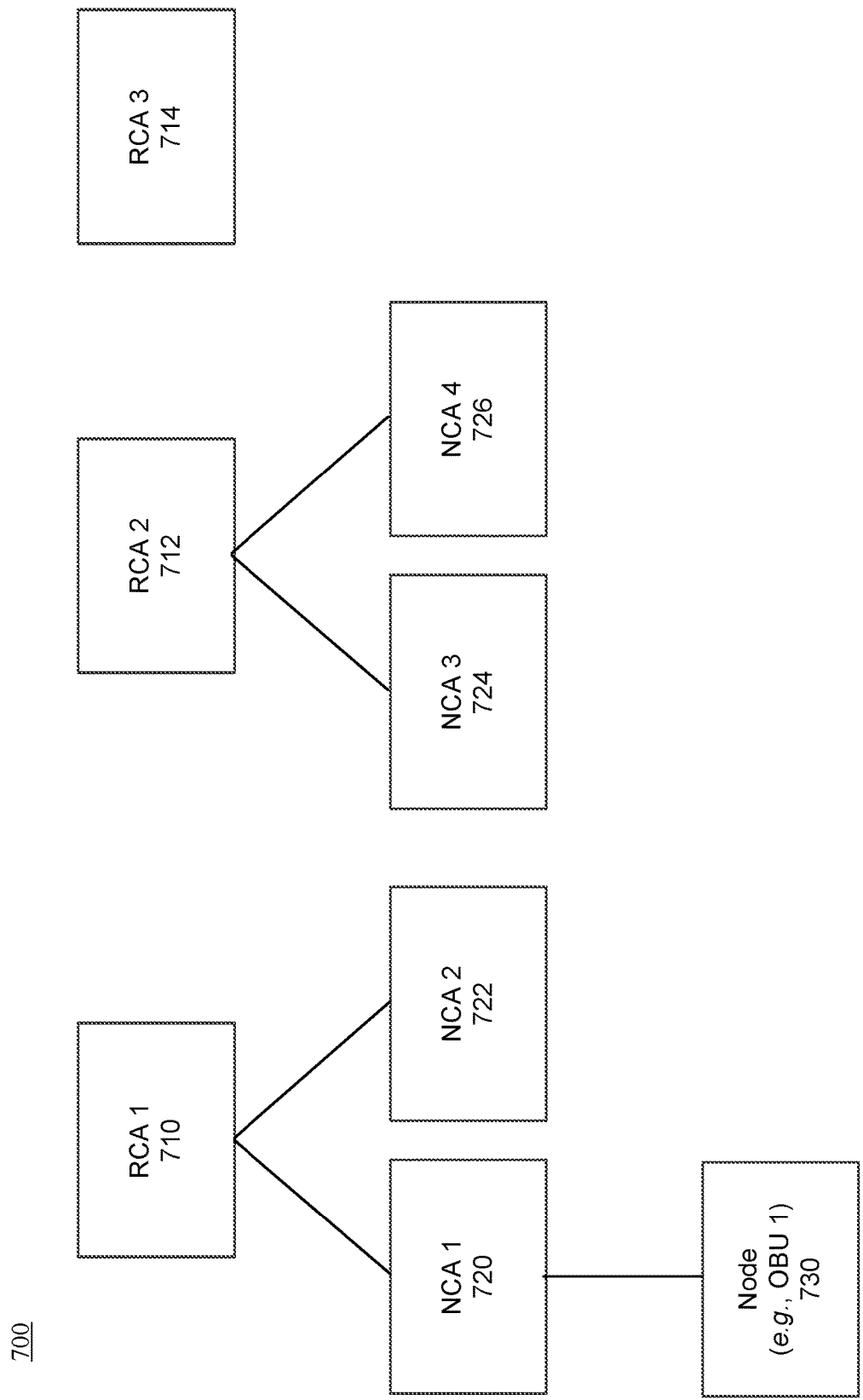
FIG. 7 is a high-level block diagram illustrating an example arrangement of a network node (e.g., an on-board unit (OBU) 1), root certificate authorities RCA 1, RCA 2, and RCA 3, and network certificate authorities NCA 1, NCA 2, NCA 3, and NCA 4 of a distributed public key infrastructure that supports distribution of certificate authorities, fault tolerance, and fallback in a network of moving things, in accordance with various aspects of the present disclosure.

FIG. 7 is a high-level block diagram 700 illustrating an example arrangement of a network node (e.g., an on-board unit (OBU) 1 730), root certificate authorities RCA 1 710, RCA 2 712, and RCA 3 714, and network certificate authorities NCA 1 720, NCA 2 722, NCA 3 724, and NCA 4 726 of a distributed public key infrastructure that supports distribution of certificate authorities, fault tolerance, and fallback in a network of moving things, in accordance with various aspects of the present disclosure. It should be noted that although the following discussions and FIG. 7 through FIG. 16 make frequent reference to a network node that is an on-board unit (OBU), such a reference is for clarity of the illustrated examples, and it should be understood that any type of network element (e.g., fixed AP, RSU, mobile AP, OBU, NC, sensor, etc.) may act as a network node in the contexts illustrated and described herein. A network in accordance with aspects of the present disclosure may have a certification authority system with multiple Root Certificate Authorities (RCAs) such as, for example, the RCAs 710, 712, 714, at the top of a hierarchical structure. The distribution of the RCAs over an area being served may, for example, be based on geography or other context information (e.g., network performance, density of vehicles per location, and network connectivity). As shown in the example arrangement of FIG. 7, the next lower level in the hierarchy of certificate authorities (CAs) may be network certificate authorities (NCAs) such as NCA 1 720, NCA 2 722, NCA 3 724, and NCA 4 726. In the arrangement shown in FIG. 7, each NCA may have a relationship with one of the RCAs to form a CA certification chain. In the example of FIG. 7, the NCA 1 720 and the NCA 2 722 are linked to, and form, certification chains with RCA 1 710, and the NCA 3 724 and NCA 4 726 are linked to, and form, certification chains with RCA 2 712. As shown in FIG. 7, the RCA 3 714 has no NCA linked to it. In accordance with aspects of the present disclosure, if a given NCA, such as for example the NCA 1 720, is disconnected/inaccessible from access by other elements of the network or becomes compromised and unable to function properly, a network node such as, for example, a mobile AP such as the OBU 1 730, a fixed AP, or any other network node may request a new certificate from another network element that is operating as an NCA and that is within communication range of the network node (e.g., OBU 1 730 of FIG. 7) such as, for example, the NCA 2 722. If the RCA of the certification chain of that NCA (e.g., the RCA 1 710 of the NCA 2 722) is offline, inaccessible, overloaded, or otherwise unavailable, the network node (e.g., OBU 1 730 may choose another NCA (e.g., NCA 3 724 or NCA 4 726) from which to request a new/updated certificate, and the chosen NCA may then ask for the new/updated certificate from a different RCA (e.g., RCA 2 712).

In accordance with various aspects of the present disclosure, RCAs such as those shown in FIG. 7 may act as a first point of trust to other network devices (e.g., sensors, fixed APs, mobile APs, etc. that are not part of the certificate chain), and so may maintain a particular set of operational RCAs, and may maintain one or more RCAs as fallback units/devices for activation and use in situations where one of the other RCAs in the network fails. In this way, such a "backup" RCA may already be known to other network devices, but may only be "turned-on"/activated when one of the other RCAs fails. A network in accordance with the present disclosure provides more freedom/flexibility at the next level of the CA hierarchy (e.g., at the NCAs), because such a network supports removing and/or creating NCAs based on, for example, certain context and security information (e.g., the volume of certificate requests, the possibility of an attack or intrusion, and the performance of the network). A network in accordance with aspects of the present disclosure may maintain a list (e.g., accessible using via an endpoint such as an application program interface (API) of a Cloud-based system, for example) that identifies updated NCAs in the PKI and the context information for each identified NCA. For example, such a list may include, by way of example and not limitation, a geographic (e.g., name or coordinates) and/or network location of each NCA, and an indication of degree of movement or stability of each NCA such as, for example, an indication of the availability of the NCA (e.g., reliably operating or shut down for periods of time) and when located in a vehicle, an indication that is representative of the mobility or movement of the vehicle carrying the NCA. For example, a fixed AP such as a road-side unit (RSU) has a much lower degree of movement than a mobile AP (e.g., OBU 730).

Such a list identifying NCAs may also include a lifetime of a certificate of each of the listed NCAs. This information enables the NCAs and, for example, other network elements/nodes that received a certificate based upon the certificate of an NCA, to know when to request a new certificate. The lifetime of certificates may, for example, depend on the level of the NCA in the hierarchy of FIG. 7, and may range from a few hours or days for a local NCA to days or months for an NCA deployed in the Cloud. The list of NCAs may also include an estimate or indication of the amount of resources allocated to the NCA-related functionality and/or a level of utilization of network node resources by NCA-related activity of the respective node in regards to, for example, processor (e.g., central processing unit (CPU)) and memory utilization, the number of certificates maintained by the NCA, the NCA connectivity (e.g., Internet access and/or an indication of the utilization of such access), and the number of processes running on the network node. Using this information, when a particular network node is in need of a certificate, the particular network node may easily select the most appropriate NCA within communication range of the particular network node, based on the characteristics and requirements of the particular network node. Such a list enables load balancing across certificate authorities such as, for example, when large numbers of certificates are to be created or when an NCA is attacked, compromised, or disabled/turned off. A network node that will need to request new certificates quite often may choose to select an NCA that receives a relatively lower number of certificate requests and that is accessible a relatively greater amount of time, while a network node with low connectivity and that needs a new certificate infrequently may choose to select a local NCA to request a new certificate. The term "low connectivity" may be used herein to describe a network node that has an intermittent connection to the Internet, or that has an Internet connection that has, for example, low bandwidth, high delay, high jitter, and/or other degradations. In spite of having poor Internet connectivity, such a network node (e.g., a fixed AP/RSU or mobile AP/OBU) may have a good connection with neighboring network nodes, and may be usable as a local NCA to provide certificates to network nodes with low connectivity to the Internet.

Figure 8:
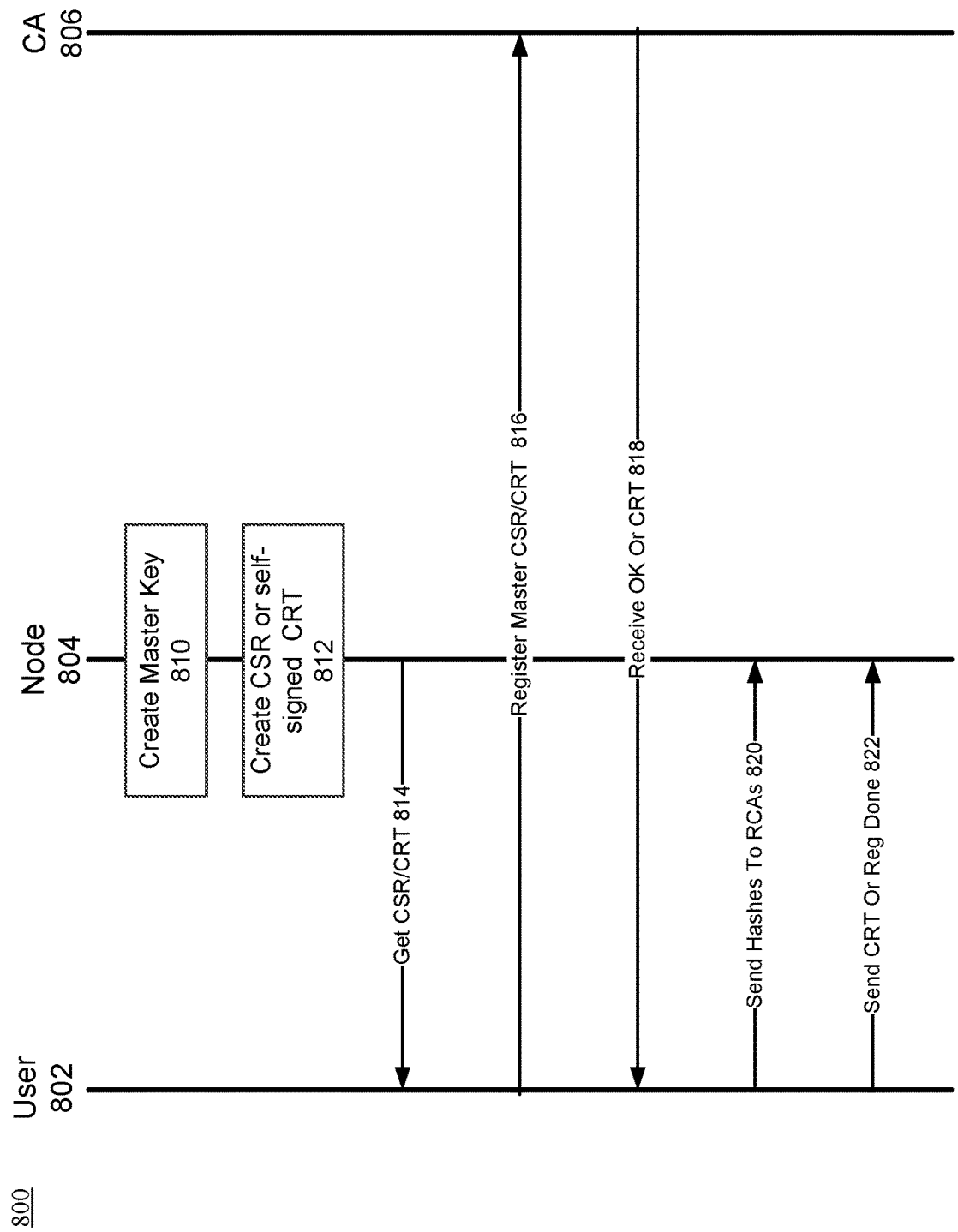
FIG. 8 is a message exchange diagram illustrating example actions and messaging involving an authorized end-user, a network node, and a certificate authority during a registration process performed at, for example, initial start-up of each network node in a distributed public key infrastructure that supports network node certificate self-management in a network of moving things, in accordance with various aspects of the present disclosure.

FIG. 8 is a message exchange diagram 800 illustrating example actions and messaging involving an authorized end-user 802, a network node 804, and a certificate authority 806 during a registration process performed at, for example, initial start-up of each network node in a distributed public key infrastructure that supports network node certificate self-management in a network of moving things, in accordance with various aspects of the present disclosure. A system in accordance with various aspects of the present disclosure automates the certification management of all network devices/network nodes of a network of moving things (e.g., an Internet of moving things) such as, for example, OBUs, APs, NCs, and sensors, by enabling such network devices to request new/updated certificates and CRLs.

The message exchange diagram 800 of FIG. 8 illustrates two example activities that may involve human intervention: the registration of a "network node master certificate" or a request for a certificate for the network node certificate signed request (CSR), and the insertion of hashes of all RCA certificates in the network node. The term "network node master certificate" may be used herein to refer to a certificate that may be used by any element/node of the network including, for example, mobile network nodes (e.g., mobile APs or OBUs), fixed network nodes (e.g., fixed APs/RSUs), network controllers, and/or any types of sensors connected to the network.

As shown in FIG. 8, at initial block 810, the network node 804 may automatically, at first boot (e.g., start-up) of the network node, generate a network node master key and at block 812, may create a CSR or a self-signed CRT (i.e., a certificate). Then, at message exchange 814, the CSR or CRT may be retrieved by the authorized end-user 802. Next, using message exchange 816, the authorized end-user 802 may register a network node master key of an employee Key/Certificate (CRT) system such as, for example, a system using what may be referred to as a "YuBiKey." Addition information about the "YuBiKey" may, for example, be requested from Yubico Inc., 420 Florence Street, Suite 200, Palo Alto, Calif. 94301. It should be noted that Key/Certificate systems other than one involving the use of a "YuBiKey" may alternatively be used without departing from the scope of the present disclosure. The authorized end-user 802 may then, at message exchange 818, receive an "OK" indication or a CRT (i.e., a certificate). The authorized end-user 802 is then, based on the Key/Certificate system, able to register a self-signed master certificate of the network node or request a master certificate based upon the CSR generated by the network node. The user 802 may then, at message exchange 820, send a list of hashes for all RCAs of the PKI to the network node 804. Then at message exchange 822, the authorized end-user 802 may send the CRT or an indication of registration complete (e.g., "Reg Done") to the network node 804. From this point of operation onward, the network node is able to self-manage certificates without human intervention.

Figure 9:
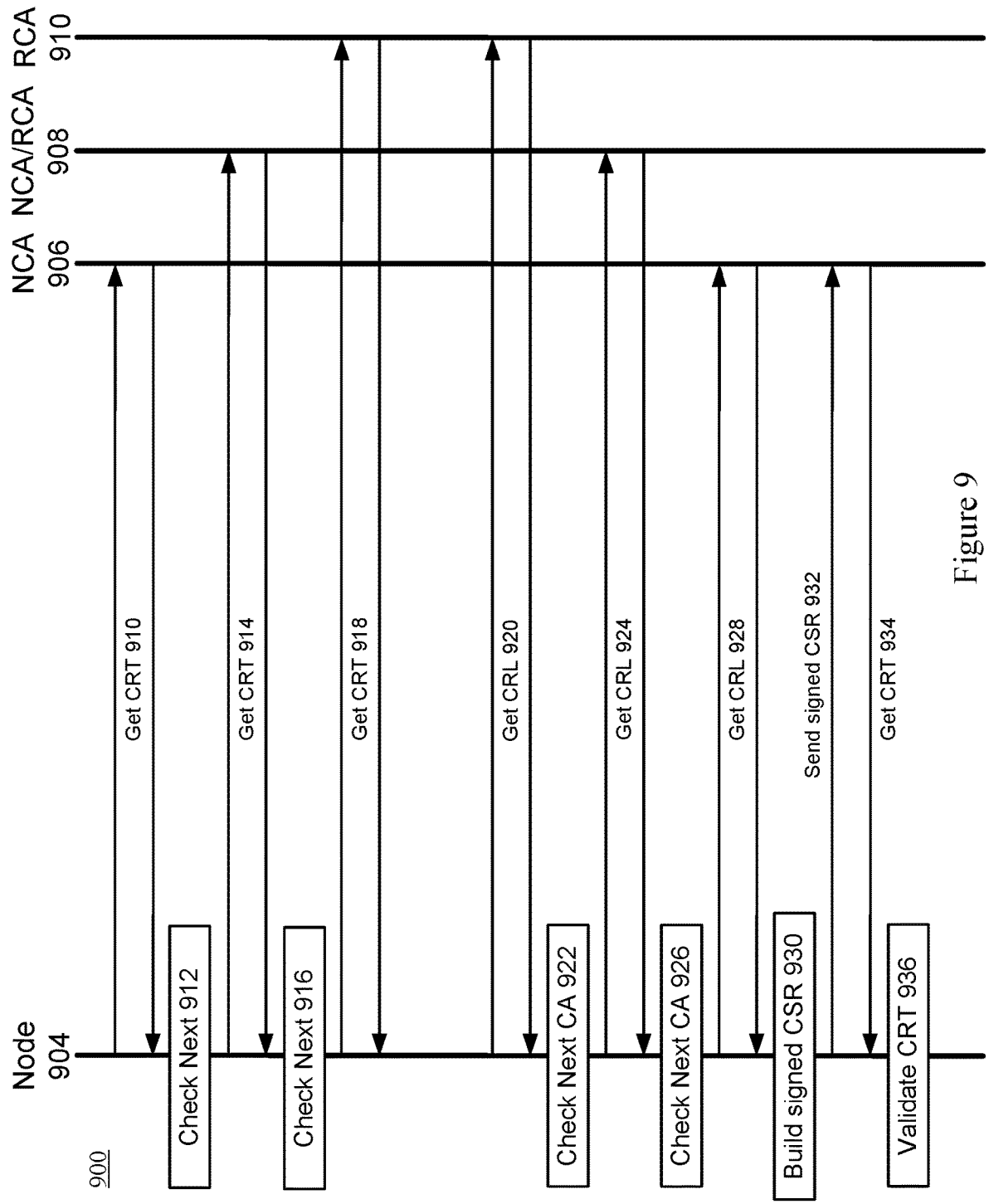
FIG. 9 is a message exchange diagram illustrating example actions and messaging involving a network node, a network certificate authority, a root certificate authority, and zero of more additional certificate authorities (e.g., NCAs and/or RCA), during a periodic CRT and CRL validation process performed based on the expiration dates of CRTs and CRLs in a network node of a distributed public key infrastructure that supports network node certificate self-management in a network of moving things, in accordance with various aspects of the present disclosure.

FIG. 9 is a message exchange diagram 900 illustrating example actions and messaging involving a network node 904, a network certificate authority 906, a root certificate authority 910, and zero of more additional certificate authorities (e.g., NCAs and/or RCA) 908, during a periodic CRT and CRL validation process performed based on the expiration dates of CRTs and CRLs in a network node of a distributed public key infrastructure that supports network node certificate self-management in a network of moving things, in accordance with various aspects of the present disclosure. The sequence of actions and message exchanges shown in FIG. 9 may occur multiple times during operation of the network node 904 depending upon, for example, the expiration dates of the CRTs and CRLs in use by the network node 904. As shown in FIG. 9, the network node 904 may begin, at message exchange 910, by getting (e.g., requesting and receiving) a CRT from a list of certificate authorities that includes the network certificate authority 906, and may then, at block 912, validate the received CRT of NCA 906 by verifying that the CRT of NCA 906 is signed by the certificate authority above the NCA 906 (e.g., the NCA/RCA 908 or RCA 910) in the CA chain. The network node 904 may then, at message exchange 914, get (e.g., request and receive) a CRT from the network/root certificate authority 908, and may then, at block 916, validate the CRT of NCA/RCA 908 by verifying that the CRT of NCA/RCA 908 is signed by the certificate authority above the NCA/RCA 908 (e.g., the RCA 910) in the CA chain. Then, the network node 904 may, at message exchange 918, get (e.g., request and receive) a CRT from the root certificate authority 910. The selection of each of the NCAs/RCAs is done to get the entire chain of CA CRTs, based on context information for the network node 904 such as, for example, availability, reputation, and network delay.

Next, the network node 904 may get the chain of CA CRLs, and verify whether any of the nodes in the certificate authority chain are in the revocation list (CRLs) of the previous CA level. As shown in FIG. 9, the network node 904 may, at message exchange 920, get (e.g., request and receive) the CRL of the RCA 910, and may, at block 922, check whether the NCA/RCA 908 is not in the CRL of RCA 910. Similarly, the network node 904 may then, at message exchange 924, get (e.g., request and receive) the CRL of the NCA/RCA 908, and may, at block 926, check whether the NCA 906 is not in the CRL of NCA/RCA 908. The network node 904 may then, at message exchange 928, get the CRL of the NCA 906, and may, at block 930, create a session key and a CSR, and use a signed CSR (e.g., a Json Web Token (JWT) carrying information such as a CSR and possibly other information fields about the CSR) signed using the master key with the CSR of the network node 904. The CSR may contain context information about the network node 904 including, by way of example and not limitation, a network node identifier (ID), a type of the network node 904, and other information to help the CA in deciding the appropriate certificate for the network node 904. The network node may then, at message exchange 932, send the signed CSR to the NCA 906, and at message exchange 934, may get in return, a CRT from the NCA 906. Then, at block 936, the network node 904 may validate the CRT received from the NCA 906. After receiving the certificate, the network node 904 is authenticated inside the certification authorities of the PKI and may start accessing the resources defined for that type of network device including, by way of example and not limitation, connection, access to the Internet, access to multimedia content, and the uploading of data.

In accordance with various aspects of the present disclosure, when a certificate of a network device (e.g., a network element/node) is about to expire, the network device may request a new certificate, such as the process as described above beginning block 930. This allows any network element/node to request new certificates for whatever purposes and in this way, the PKI may provide a new certificate, without human intervention, for any network element/node that was registered in the PKI.

The request for all CRLs, discussed above may, for example, be done periodically including, for example, on a regular time interval, or may be performed after a trigger from the CA system when a new CRL is made available to be downloaded. In this way, a system in accordance with the present disclosure ensures that all authorized nodes of the network have information about any network node whose certificate has been revoked in the PKI, enabling the authorized nodes of the network to be able to deny access to any restricted resource or to refuse any requests from the network node whose certificate has been revoked.

Figure 10:
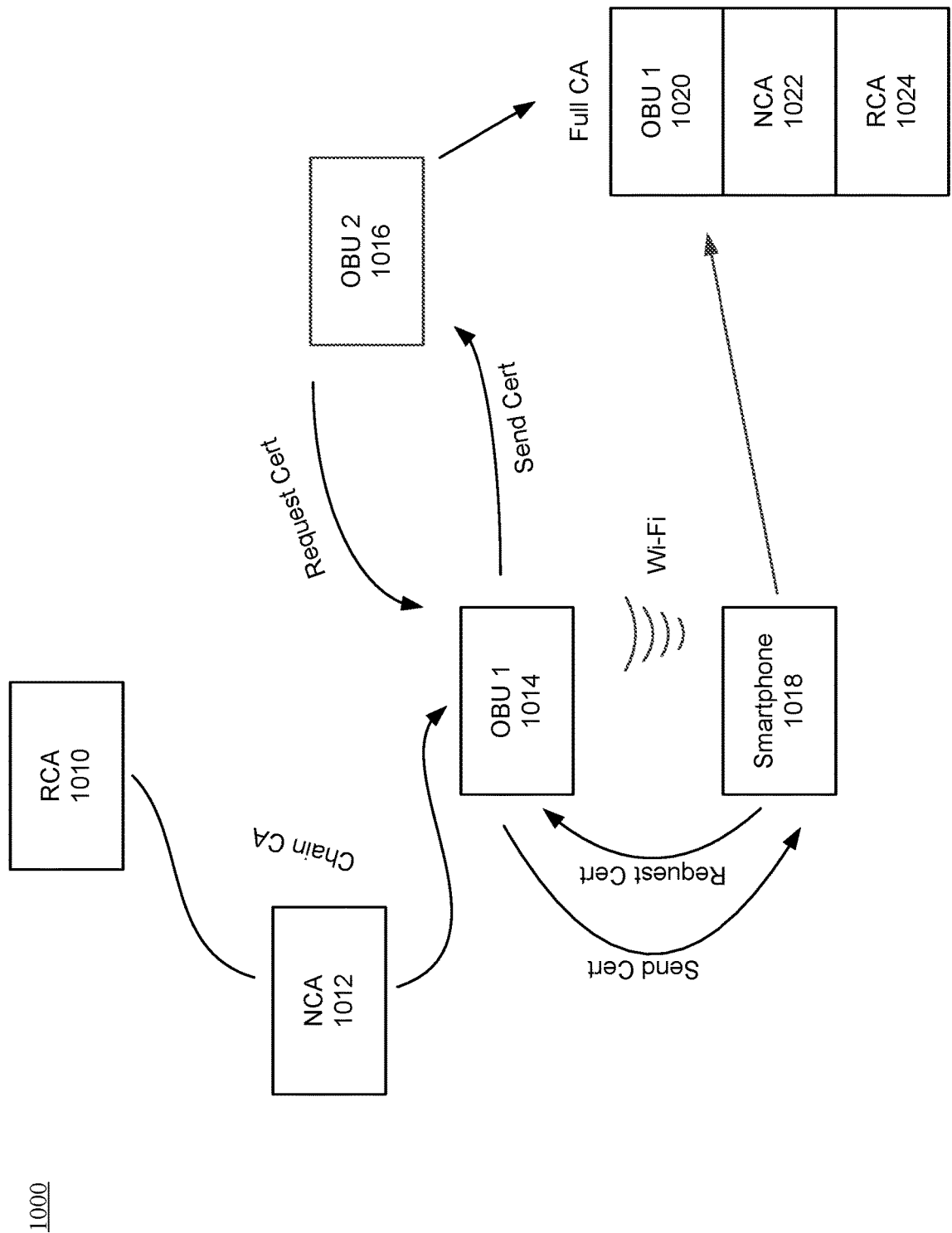
FIG. 10 is a block diagram showing an example of a mobile network node acting as a certificate authority of a distributed public key infrastructure that supports network node certificate self-management in a network of moving things, in accordance with various aspects of the present disclosure.

FIG. 10 is a block diagram 1000 showing an example of a mobile network node acting as a certificate authority of a distributed public key infrastructure that supports network node certificate self-management in a network of moving things, in accordance with various aspects of the present disclosure. The illustration of FIG. 10 includes a certificate authority chain comprising a root certificate authority RCA 1010, a network certificate authority 1012, and a first on-board unit (OBU) 1 1014 acting as a mobile certificate authority for a second OBU 2 1016 and a smartphone 1018.

The OBU 1 1014 and OBU 2 1016 may correspond to, for example, the OBUs shown in or described herein with regard to FIG. 1 to FIG. 9.

In accordance with various aspects of the present disclosure, it is possible to have local mobile network elements (e.g., network nodes such as OBUs) as the last hierarchical level of the CAs, to provide certificates to network devices connected through, for example, Wi-Fi or neighbor OBUs when those network elements/nodes don't have connection to the Internet such as, for example, the smartphone 1018 and/or OBU 2 1016 of FIG. 10. Certificates provided to the local network devices via a wireless communication technology (e.g., IEEE 802.11a/b/g/n/ac/af (e.g., Wi-Fi), DSRC, Bluetooth®) may, for example, have an expiration date based on the context information of the network devices such as, by way of example and not limitation, a type of the network device, a geographic (e.g., name or coordinate) and/or network location, and connectivity. For example, a network node such as the OBU 1 1014 may provide a certificate for a network device of an end-user, to enable access to content for a period of time such as, for example, having a duration close to the average trip time of riders on a transit line (e.g., a taxi, bus, train, boat, autonomous vehicle, etc.) and then revoke the certificate for the network device of the end-user when the network device of the end-user moves out of wireless communication (e.g., Wi-Fi) range if the certificate is still valid. The certificate may, for example, be generated using information about the purpose of the network device such as, for example, specific applications in which sensors aboard a vehicle upload data to specific APIs. In such a situation, OBUs (e.g., OBU 1 1014) acting as local CAs may ask the next higher level of CA (e.g., NCA 1012) for the permission to sign CSRs from other network devices. The decision of such network elements/nodes that are able to operate as local CAs may take into account context information of the network elements/nodes such as, by way of example and not limitation, the reputation of the network element/node, connectivity of the network element/node, network element/node contacts, and mobility behaviors/patterns of the network element/node. In a network in accordance with aspects of the present invention, an NCA (e.g., NCA 1012) may maintain a list of OBUs currently acting/authorized to act as CAs (e.g., containing an entry for OBU 1 1014), and the context information of such OBUs, so that the NCA may easily revoke the certificate or permission of a particular OBU to act as a CA. In such a situation, all certificates signed by the OBU whose certificate or permission to act as CA has been revoked, may be made invalid. This behavior introduces a scalable approach for managing the certificates of a network of moving things (e.g., an Internet of moving things), where the certificates provided to the wireless (e.g., Wi-Fi) enabled devices wirelessly connected to an OBU may be defined with appropriate expiry date and maintained locally.

Figure 11:
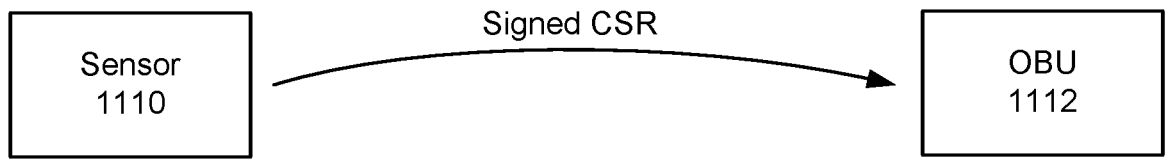
FIGS. 11-14 are block diagrams showing example mechanisms that may be employed for certificate renewal over a delay-tolerant network (DTN) having a distributed public key infrastructure that supports network node certificate self-management of a network of moving things, in accordance with various aspects of the present disclosure.
Figure 12:
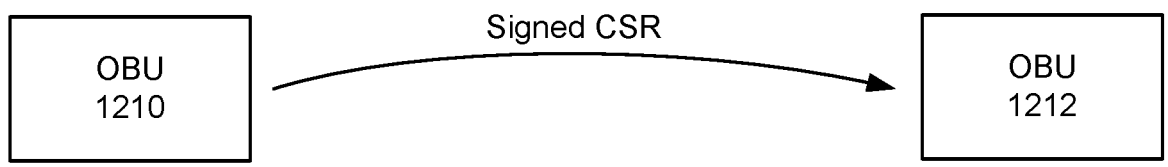
Figure 13:
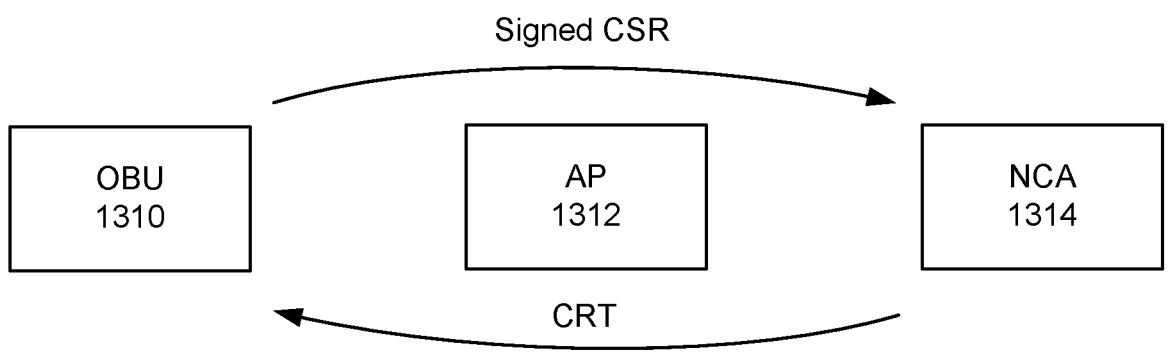
Figure 14:
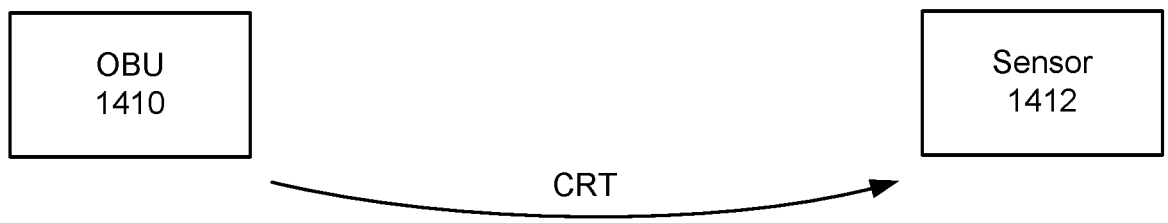

FIGS. 11-14 are block diagrams showing example mechanisms that may be employed for certificate renewal over a delay-tolerant network (DTN) having a distributed public key infrastructure that supports network node certificate self-management of a network of moving things, in accordance with various aspects of the present disclosure. Such a network approach may, for example, include the use of DTN concepts to allow the sending of a signed CSR (e.g., using a Json Web Token) with a CSR (certificate signed request), and the receipt of a network node certificate from any network node of the DTN, as illustrated in FIGS. 11 to 14. The DTN in this context may be, for example, any delay tolerant mechanisms that allow a network node to cache and forward the signed CSR/CRT in an opportunistic way. As illustrated in FIG. 11, a sensor (e.g., sensor 1110) may send a copy of a signed CSR to an OBU (e.g., OBU 1112), and a signed CSR received by an OBU (e.g., OBU 1210) may be forwarded to other OBUs (e.g., OBU 1212), as shown in FIG. 12. As illustrated in FIG. 13, an OBU (e.g., OBU 1310) may send a received signed CSR to the PKI (e.g., to NCA 1314 via AP 1312), when an Internet connection is determined to be available. And as shown in FIG. 14, such a sensor (e.g., sensor 1412) may later receive a CRT as a response from an OBU (e.g., OBU 1410). In accordance with aspects of the present disclosure, an OBU may, for example, send one or more copies of a CRT to other OBUs that may later deliver the CRT to sensor(s), when the OBU's are in range of the sensor(s). In accordance with further aspects of the present disclosure, the OBUs or other network devices (e.g., network elements/nodes) of the DTN may also maintain the CRT of the other network devices, which the OBUs may carry to use in the future (e.g., to access neighbor resources, such as a connection, download/upload, and encryption). Such aspects of the present disclosure may be of particular importance for static devices at a fixed geographic location, where vehicles pass nearby (e.g., sensors placed in/near a road). If for some reason the signed CSR is dropped or lost, an OBU may ask again for a certificate. The certificate may be seen by any entity between the source and destination, because such observation does not reveal the session key of the network element/node. Also, if someone/something were to steal the certificate on the trip back to the sensor, the certificate cannot be used by the person/device that stole the certificate, because the certificate is valid only when used together with a session key of the sensor, which is never outside of the network element/node.

Figure 15:
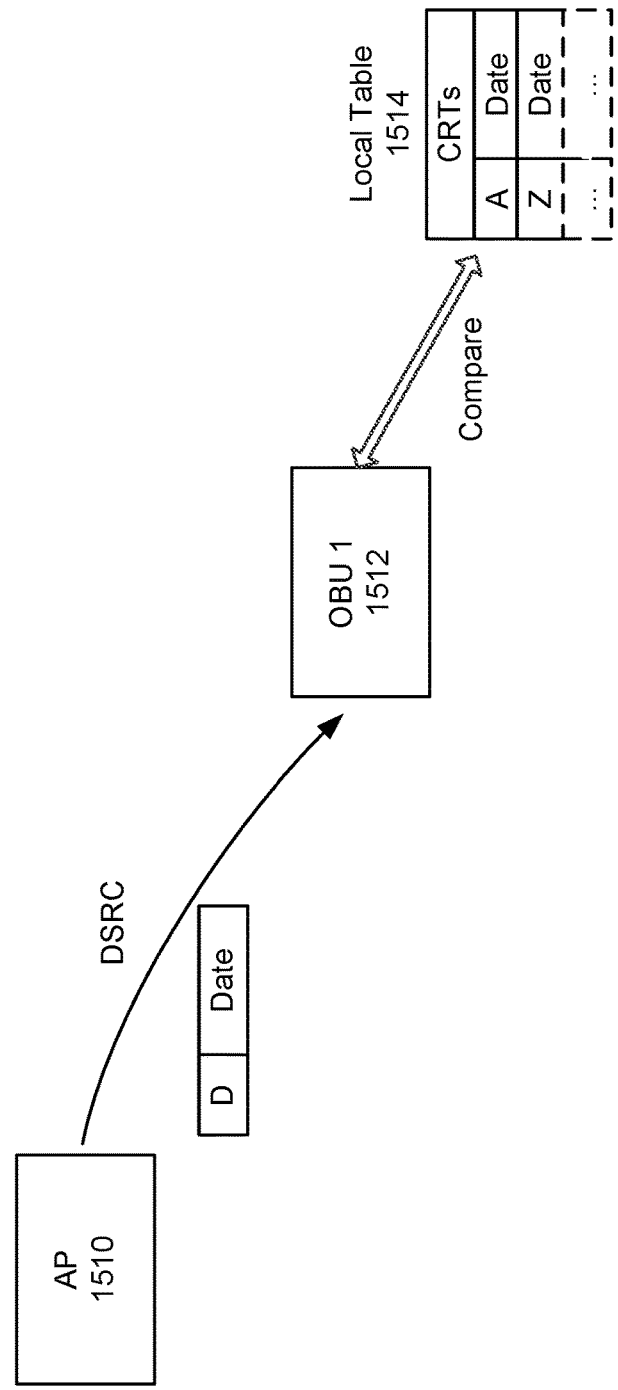
FIG. 15 is a block diagram showing an example mechanism that may be employed for dissemination of certificate revocation lists (CRLs) for a distributed public key infrastructure (PKI) that supports network node certificate self-management of a network of moving things, in accordance with various aspects of the present disclosure.

FIG. 15 is a block diagram 1500 showing an example mechanism that may be employed for dissemination of certificate revocation lists (CRLs) for a distributed public key infrastructure (PKI) that supports network node certificate self-management of a network of moving things, in accordance with various aspects of the present disclosure. The illustrated example of FIG. 15 includes an access point 1510 wirelessly linked via DSRC to an OBU 1 1512 having a local table 1514 containing entries for a number of CRTs. The OBUs/APs of a network of moving things in accordance with aspects of the present disclosure are able to provide a service in which such OBUs/APs notify neighboring network elements/nodes about the CRLs currently known to the OBUs/APs. Such information identifying the CRLs currently known to each OBU/AP may be broadcast by the OBUs/APs to the neighboring network elements/nodes, or may be available from the OBUs/APs upon request of the neighboring network elements/nodes. The neighboring network node may then request specific CRLs.

Figure 16:
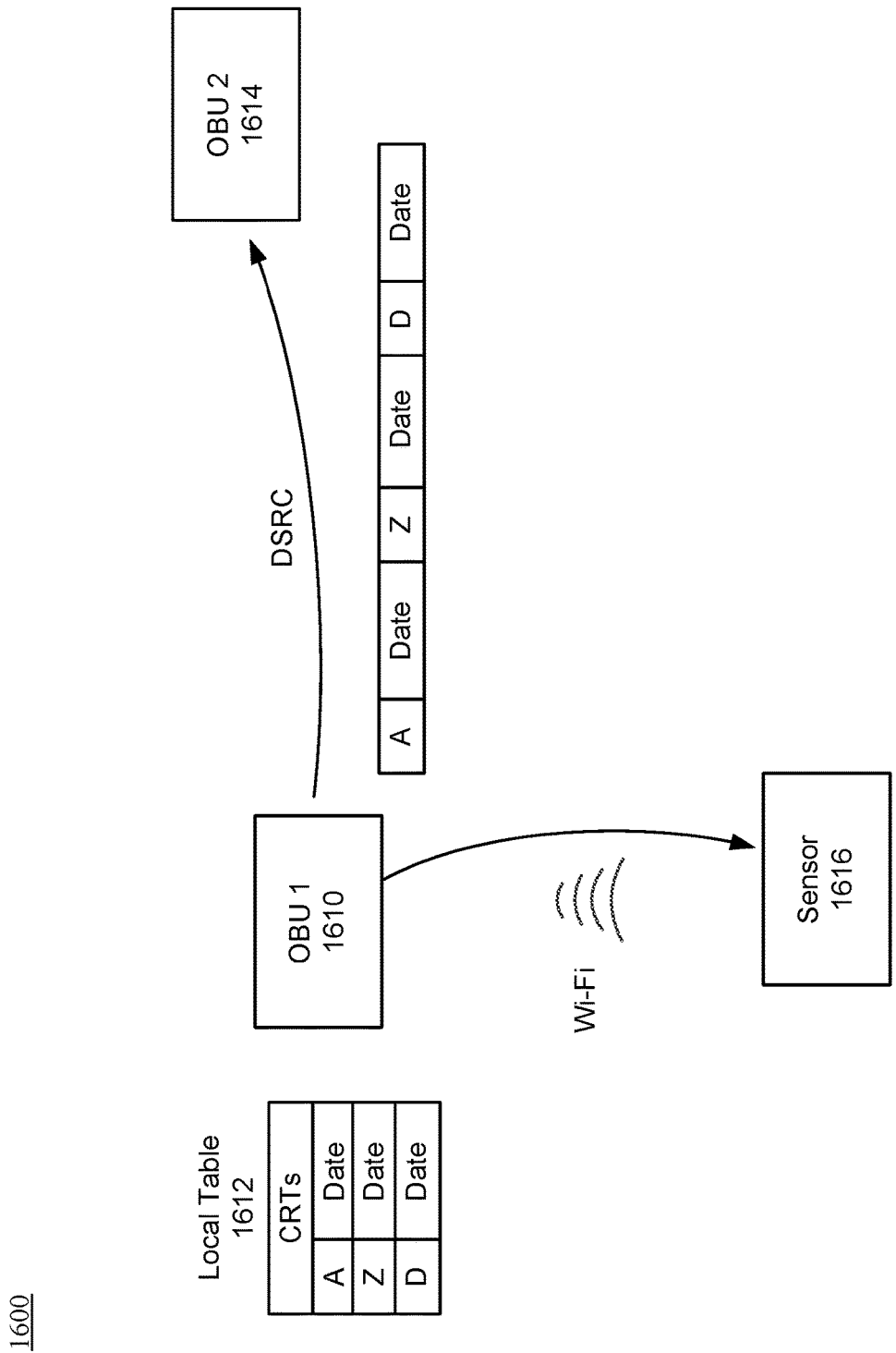
FIG. 16 is a block diagram showing an example mechanism that may be employed for dissemination of certificate revocation lists (CRLs) for a distributed public key infrastructure (PKI) that supports network element/node certificate self-management of a network of moving things, in accordance with various aspects of the present disclosure.

FIG. 16 is a block diagram 1600 showing an example mechanism that may be employed for dissemination of certificate revocation lists (CRLs) for a distributed public key infrastructure (PKI) that supports network element/node certificate self-management of a network of moving things, in accordance with various aspects of the present disclosure. As shown in the example of FIG. 16, a network element/node such as, for example, the OBU/AP (e.g., OBU 1 1610) may periodically send to neighboring network elements/nodes (e.g., to OBU 2 1614 via DSRC, and to sensor 1616 via Wi-Fi), a notification including a list of one or more current CRLs that may be maintained in a local table in the OBU/AP (e.g., local table 1612 of OBU 1 1610). The time interval between the sending of such notifications by a particular network element/node (e.g., OBU 1 1610) may be automatically adjusted (e.g., by the particular network element/node) based on, by way of example and not limitation, the number of network elements/nodes that are neighbors of the particular network element/node, and/or a degree of difference of CRLs between neighboring network elements/ nodes. For example, a network element/node such as, for example, OBU 1 1610 may, upon receiving a relatively larger number of new/updated CRLs from neighboring network elements/nodes (e.g., OBU 2 1614) and/or a CA, reduce the time interval between the sending of notifications (e.g., increase the frequency of sending of notifications) to neighboring network elements/nodes. In another example, a certain network element/node such as, for example, OBU 2 1614 may, upon receiving a CRL from a neighboring network element/node such as, for example, OBU 1 1610, compare the content of, for example, the CRL just received from the neighboring network element to the next most recently received CRL, or to a CRL created by the certain network element/node (e.g., OBU 2 1614) from multiple previously received CRLs. This comparison may determine the amount or extent to which the content of the CRL receive by the certain network element/node matches (e.g., or differs from) the next most recently received CRL, or to a CRL created by the certain network element/node (e.g., OBU 2 1614) from multiple previously received CRLs. In this way, a relatively larger difference between the CRL received from the neighboring node (e.g., from OBU 1 1610) and the CRL information known to the network element/node (e.g., at the OBU 2 1614), the relative shorter the time interval between the sending of notifications by the certain network element/ node (e.g., OBU 2 1614) may be, and vice versa. The information that may be included for each CRL in such notifications may include, by way of example and not limitation, an identifier of the CRL, a defined location on the CA chain of the sender of the notification (e.g., RCA_NCA3_OBU255), and a creation date of the CRL (e.g., a date/time such as 2016/11/01 14:00:00 UTC). A CRL may contain fewer parameters, more parameters, or a different set of parameters, without departing from the spirit and scope of the present disclosure. In accordance with various aspects of the present disclosure, a CRL may also be downloaded from, for example, a cloud-based or network resident CA system, if the network element/node has Internet access. Elements/nodes of a network according to the present disclosure may register their interest in CRL-related information with CAs of the network (or other network elements/nodes), so that the registered network elements/ nodes are notified when new/updated CRL-related information becomes available. The CAs of the network may then trigger/notify the network elements/nodes that previously registered with the CAs (e.g., using an indication of interest in notification related to changes in content of message queues related to a specific topic (e.g., in this example, "CRLs")), to alert the network elements/nodes of new/ updated CRLs, and a network node receiving such an alert may then download the CRLs and start disseminating the new CRLs to other elements/nodes in the network.

Figure 17A:
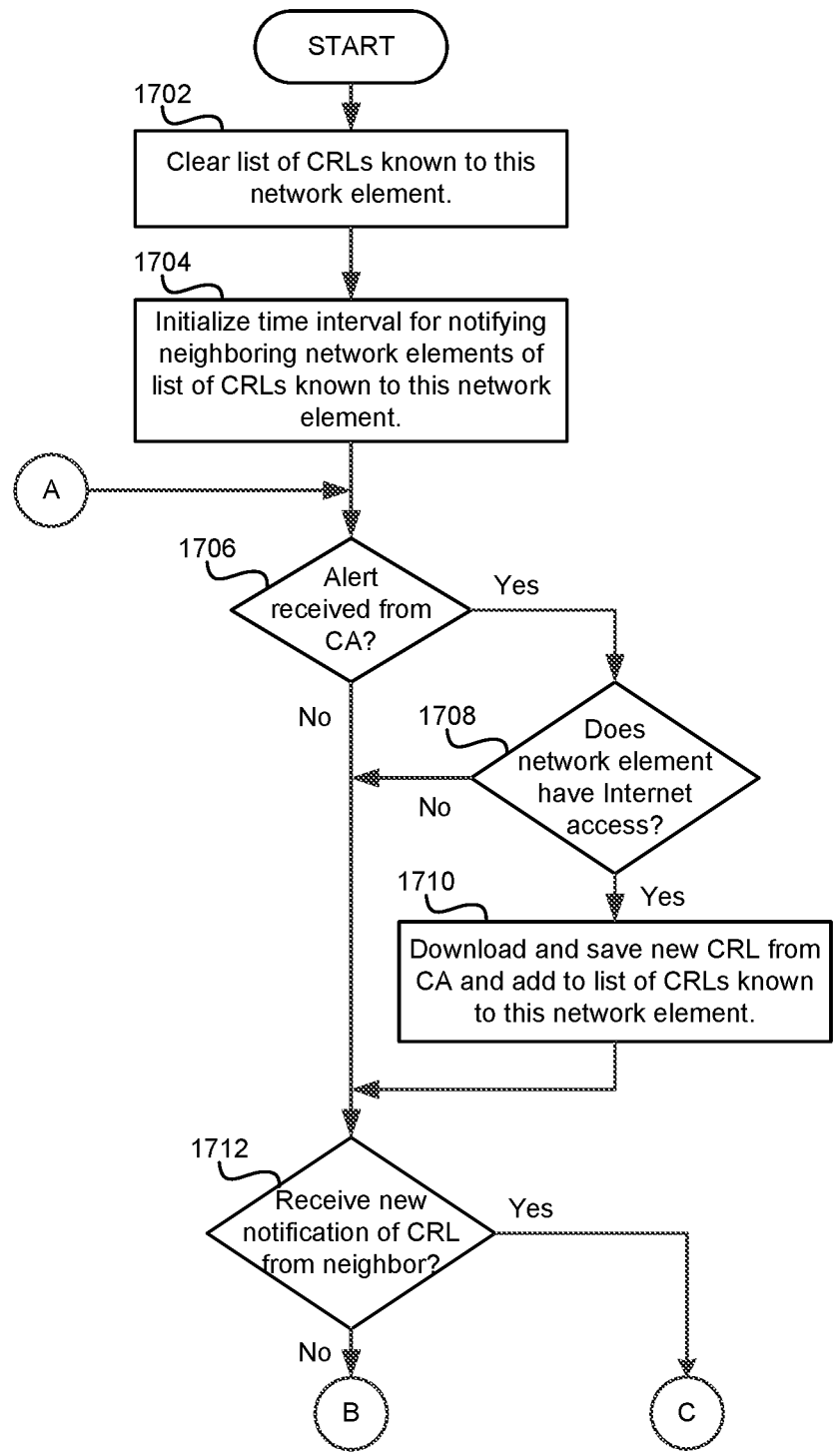
FIGS. 17A-17C are a flowchart of an example method of operating a network element to disseminate certificate revocation lists (CRLs) for a distributed public key infrastructure (PKI) that supports network element/node certificate self-management of a network of moving things, in accordance with various aspects of the present disclosure.
Figure 17B:
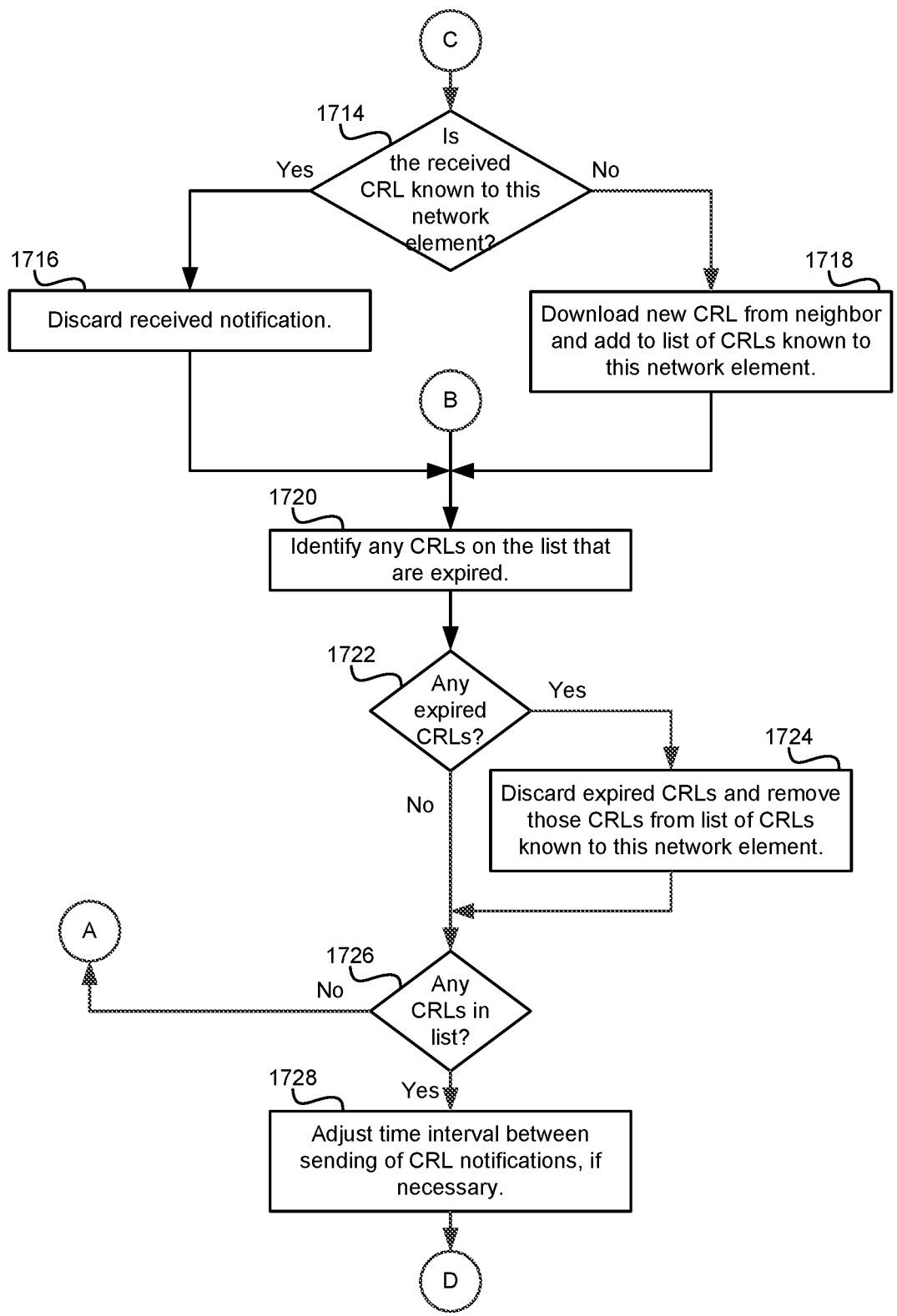
Figure 17C:
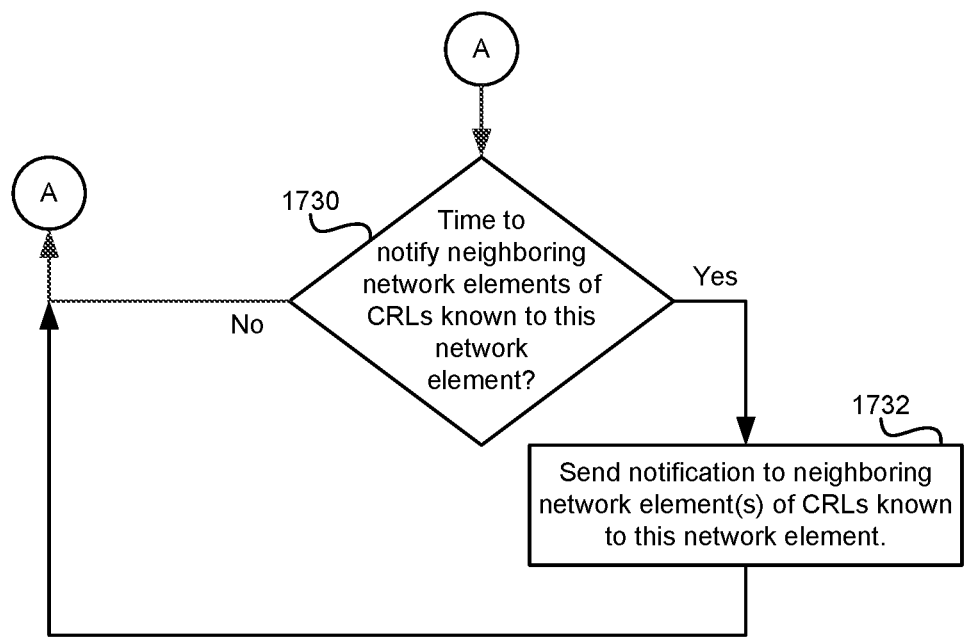

FIGS. 17A-17C are a flowchart 1700 of an example method of operating a network element to disseminate certificate revocation lists (CRLs) for a distributed public key infrastructure (PKI) that supports network element/node certificate self-management of a network of moving things, in accordance with various aspects of the present disclosure. The network element performing the method of FIGS. 17A-17C may be any of the network elements/nodes illustrated in and/or described above with respect to FIGS. 1-16 including, for example, OBUs 1610, 1614 of FIG. 16. The actions of the method illustrated in FIGS. 17A-17C may be performed by software and/or firmware instructions executed by one or more processors of a system of a network element/node in accordance with various aspects of the present disclosure. Although the method is illustrated as an example sequence of particular actions, it should be noted that the order of the example actions shown in FIGS. 17A-17C may be modified, and the actions performed may be altered, without departing from the spirit and scope of the present disclosure. The method of FIGS. 17A-17C begins at block 1702, following activation/power-up/reset of the network element performing the method.

At block 1702, the method of FIGS. 17A-17C may clear/initialize storage for a list of certificate revocation lists (CRLs) known to and maintained by the network element/ node performing the method. Then, at block 1704, the method may set an initial value for a time interval for notifying neighboring network elements/nodes (e.g., FAPs/ RSUs, OBUs/MAPs, NCs, etc.) of the CRLs known to the network element performing the method. Neighboring elements/nodes may be those elements/nodes of a network according to the present disclosure that are within wireless communication range (e.g., radio frequency wireless communication range) of the network element performing the method (e.g., direct wireless communication range (e.g., via DSRC, Bluetooth®, Wi-Fi, etc.).

Next, at block 1706, the method may determine whether an alert has been received from a certificate authority (CA). Such an alert may be transmitted by a CA at the time of revocation of one or more certificates, and the CA may send the alert to notify the elements/nodes of the network that the network elements/nodes may download an updated CRL showing information about the one or more revoked certificates. The network elements/nodes may, for example, download the updated CRL from one or more sources including, for example, a cloud-based system if, for example, the network element/node that received the alert has access to the Internet, or another suitable communication path (e.g., the DTN of the network of moving things, a cellular network) via which the network element may access one or more source(s) of the new CRL. If, at block 1706, the method determines that an alert has been received then, at block 1708, the method may check whether data communication path(s) to the source(s) of the new/updated CRL is/are available. If, at block 1708, the method of FIGS. 17A-17C determines that no data communication path(s) is/are currently available to access the source(s) of the new/updated CRL, the method may then proceed to block 1712, to be discussed below. If, however, at block 1708, the method determines that a data communication path to a source of the new/updated CRL is available, then the method may proceed to block 1710, where the network element/ node performing the method may download and save the new/updated CRL, and add the new/updated CRL to the list of CRLs known to the network element/node. The method then continues at block 1712, discussed below.

At block 1712, the method determines whether a notification has been received from a neighboring network element/node, where such a notification informs the network element/node that the neighboring network element/node has information for one or more CRLs that that neighboring network element/node is able to share with other network elements/nodes. If the method, at block 1712, determines that the network element/node performing the method has received such a notification identifying CRLs for which the neighboring network element/node has information to share, the method of FIGS. 17A-17C may proceed to block 1714 of FIG. 17B, discussed below. If, however, the network element/node performing the method has not received such a notification that the neighboring network element/node has information for CRLs to share, the method of FIGS. 17A-17C may proceed to block 1720 of FIG. 17B, discussed below.

At block 1714, the method may determine whether the CRL(s) identified in the received notification are already known to the network element/node (e.g., on the list of CRLs known to the network element/node performing the method). For example, in some instances, a network element/node may receive one or more notifications from neighboring network elements/nodes that identify CRLs of which the receiving network element/node has previously been made aware (e.g., via alerts or sharing by neighboring element/nodes). If it is determined, at block 1714, that the CRL(s) is/are not known to the network element/node receiving the notification, the CRL may proceed to block 1718, where the network element/node may download the new CRL(s) from neighboring element(s)/nodes(s) or other sources (e.g., cloud-based sources), and the received CRL(s) may then be added to the list of CRLs known to the network element/node performing the method. The method may then proceed to block 1720, discussed below. If, however, it is determined, at block 1714, that the CRL(s) is/are known to the network element/node receiving the notification, the method may proceed to block 1716, where the network element/node may discard the received notification, and then continue at block 1720, discussed below.

At block 1720, the method of FIGS. 17A-17C may identify any expired CRLs in the list of CRLs known to the network element/node performing the method. In accordance with various aspects of the present disclosure, each CRL may include, for example, an expiration date and/or time at which the corresponding CRL expires and will no longer be used by nodes of the network. At block 1722, the method may determine whether any expired CRLs were identified at block 1720. The method may then, in a first case, continue at block 1726, if no expired CRLs were identified in the list of CRLs known to the network element/node performing the present method or may, in a second case, proceed to block 1724, if one or more expired CRLs were identified, where the method may discard any CRL(s) identified as being expired, and remove any expired CRLs from the list of CRLs known to this network element/node. The method may then continue at block 1726, discussed below.

At block 1726, the method may determine whether there are any CRLs in the list of CRLs known to the network element/node performing the method. At certain times (e.g., at the start of operation of the network element/node, or when all CRLs in the list of CRLs have expired), there may be no CRLs in the list of CRLs known to the network element/node performing the method. If it is determined, at block 1726, that the list of CRLs known to the network element/node is empty, the method may continue at block 1706, discussed above. If, however, the method determines, at block 1726, that there are one or more CRLs in the list of CRLs known to the network element/node, then the method may continue at block 1728.

At block 1728, the method of FIGS. 17A-17C may adjust the time interval between the occurrences of sending, by the network element/node performing the method, of notifications of CRLs available from that network element/node. In accordance with various aspects of the present disclosure, the time interval between the sending of the notifications of CRLs by a network element/node, as described above, may be adjusted according to, for example, the number of network elements/nodes that are neighbors of the network element/node performing the method of FIGS. 17A-17C, and/or may be adjusted according to the number of CRLs in the list of CRLs maintained by the network element/node performing the method. For example, such a time interval may be adjusted to be relatively shorter when the number of network elements/nodes that are neighbors of the network element/node performing the method becomes relatively larger, and vice versa, resulting in relatively more frequent transmissions to neighboring network element/nodes of notifications of CRLs known to the network element/node performing the method, as the number of neighboring network element/nodes is relatively larger. Similarly, such a time interval may also be adjusted to be relatively shorter when the number of CRLs in the list of CRLs known to the network element/node performing the method becomes relatively larger, and vice versa, resulting in more frequent transmissions to neighboring network element/nodes of notifications of CRLs known to the network element/node performing the method, as the number of CRLs known to that network element/node becomes relatively larger. Once such adjustment is made to the time interval between the sending of notifications to neighboring network elements/nodes of CRLs available from the network element/node performing the method of FIGS. 17A-17C, the method may then proceed to block 1730 at FIG. 17C.

At block 1730, the method may determine whether it is time to notify neighboring network elements/nodes of the CRLs known to the network element/node performing the method (e.g., by determining whether the amount of time in the current time interval has passed since the most recent transmission of the list of CRLs known to the network element/node performing the method). If the method determines, a block 1730, that it is not yet time to notify neighboring network elements/nodes of the CRLs known to the network element/node performing the method, the method may continue at block 1706, discussed above. If, however, the method determines, a block 1730, that it is time to notify neighboring network elements/nodes of the CRLs known to the network element/node performing the method, the method proceeds to block 1732, where the method may proceed to send a notification to the neighboring network element(s)/node(s) of the contents of the list of CRLs known to the network element/node performing the method. Such a notification may be done wirelessly using, for example, radio frequency protocols including Dedicated Short Range Communication (DSRC) (e.g., IEEE 802.11p), Wi-Fi (e.g., IEEE 802.11a/b/g/n/ac/ad/af), Bluetooth® (e.g., IEEE 802.15.4), or another wireless protocol for communication between fixed and mobile nodes of a plurality of nodes of a network according to the present disclosure. Once the notification has been sent, the method may continue at block 1706, discussed above.

A network of moving things in accordance with various aspects of the present disclosure supports a dynamic and distributed PKI to launch/destroy CAs of hierarchically different levels based on context information such as, for example, geographic (e.g., name or coordinates) and/or network location, amount and/or types of resources requested, and/or network performance. In such a network, various network elements/nodes including, for example, OBUs, may act as local CAs for network devices inside of vehicles such as, for example, for sensors and for end-user devices. Such a network may support integration of a PKI with delay tolerant communication mechanisms, to provide self-management of certificates for network nodes without access to the Internet (e.g., for OBUs without Internet access and for sensors installed close to the road). A network in accordance with aspects of the present disclosure enables integration with Key/Certificate systems (e.g., a "Yubikey"-based system) to enable registration of network device master certificates inside a PKI, only by authorized individuals with the proper information (e.g. a "Yubikey"). Support for the download and validation of entire CA and CRL chains of the nodes of a network from the certification authorities of a PKI is included in accordance with aspects of the present disclosure, and automatic renovation of the certificates of network devices before expiration is provided. Revocation of session certificates or master certificates is supported, to enable management of situations in which a network element/node is compromised, attacked, stolen, or destroyed. In addition, dissemination mechanisms to provide distribution of new CRLs to all network elements/nodes using the certification authorities of a PKI is provided, so that unauthorized network elements/nodes will not have access to restricted resources, and other network elements/nodes will not communicate with unauthorized network elements/nodes.

Various aspects of the present disclosure provide a set of methods and mechanisms for managing certificates in a network of moving things (e.g., an Internet of moving things), enabling a certain degree of personalization and adjustment based on context information of the network nodes and the network. The authentication used to support such a network of moving things is done in a self-managed way without human intervention, making it possible to authenticate all network devices belonging to any network provider or third-party such as, for example, sensors, OBUs, APs, and NCs. In accordance with various aspects of the present disclosure, a network device that does not have a certificate will not be able to access a particular set of resources provided by a provider such as, by way of example and not limitation, Internet access, access to multimedia content, and the ability to upload data. In this manner, a network as described herein provides a more secure and controlled environment for a network of moving things, including the resources to which access should be restricted. In accordance with aspects of the present disclosure, context information of the network device/user needing a certificate takes into account the purpose of the network device and a desired expiration date. A certificate management system in accordance with aspects of the present disclosure exploits the certificates as the foundation to access controlled resources, and uses the issued certificates to authenticate every network device that needs access to restricted resources including, for example, connectivity, Internet access, device access/management, access to multimedia content, and the ability to upload and/or download data to/from the cloud.

Various aspects of the present disclosure may be found in a method of managing digital certificates in nodes of a wireless network comprising a plurality of nodes. Such a method may comprise receiving, at a first node of the plurality of nodes from a second node of the plurality of nodes, a notification comprising information identify one or more certificate revocation lists, wherein each certificate revocation list identifies one or more digital certificates that have been revoked, and wherein each digital certificate prior to revocation authorizes access to a service supported by the wireless network. The method may adding to a list of certificate revocation lists maintained by the first node, the information identifying those of the one or more certificate revocation lists not already present on the list of certificate revocation lists; and adjusting a time interval based on a number of nodes of the plurality of nodes within wireless communication range of the first node. The method may comprise periodically sending the list of certificate revocation lists to nodes of the plurality of nodes within wireless communication range of the first node, according to the time interval; and rejecting a request from a third node of the plurality of nodes for access to a resource of the first node, based on a digital certificate of the third node and the digital certificates identified by the certificate revocation lists of the list of certificate revocation lists.

In accordance with aspects of the present disclosure, the method may further comprise receiving, from a certificate authority of the wireless network, an alert identifying a certificate revocation list identifying at least one revoked digital certificate. The plurality of nodes may comprise one or more fixed nodes at respective fixed physical locations and one or more mobile nodes that are mobile within a service area of the wireless network. One or more nodes of the plurality of nodes may comprise mobile access point functionality configured to provide radio frequency wireless Internet service by the wireless network to one or more end-user devices. One or more nodes of the plurality of nodes may also comprise interface functionality configured to communicate with a system of an autonomous vehicle. Each certificate revocation list may comprise a respective indication of one or both of a date and a time of expiration, and the method may further comprise discarding a certificate revocation list identified on the list of certificate revocation lists and removing the discarded certificate revocation list from the list of certificate revocation lists, according to the respective indication of expiration of each certification revocation list on the list of certificate revocation lists. The method also comprise adjusting the time interval based on a number of certificate revocation lists on the list of certificate revocation lists.

Additional aspects of the present disclosure may be seen in a non-transitory computer-readable medium on which is stored a number of code sections. Each such code section may comprise a plurality of instructions executable by one or more processors to cause the one or more processor to perform the steps of a method of managing digital certificates in nodes of a wireless network comprising a plurality of nodes. The steps of the method may be such as those of the method described above.

Further aspects of the present disclosure may be observed in a system for managing digital certificates in nodes of a wireless network comprising a plurality of nodes. Such a system may comprising at a first node of the plurality of nodes, one or more processors operably coupled to storage for storing a list of certificate revocation lists and to one or more wireless communication interfaces for communication with other nodes of the plurality of nodes. The one or more processors may be operable to, at least, perform the actions of a method of managing digital certificates in nodes of a wireless network comprising a plurality of nodes, such as the method set forth above.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of managing digital certificates in nodes of a wireless network comprising a plurality of nodes, the method comprising:
    receiving, at a first node of the plurality of nodes from a second node of the plurality of nodes, a notification comprising information identify one or more certificate revocation lists, wherein each certificate revocation list identifies one or more digital certificates that have been revoked, wherein each digital certificate prior to revocation authorizes access to a service supported by the wireless network, and wherein each certificate revocation list comprises a respective indication of one or both of a date and a time of expiration;
    adding to a list of certificate revocation lists maintained by the first node, the information identifying those of the one or more certificate revocation lists not already present on the list of certificate revocation lists;
    adjusting a time interval based on a number of nodes of the plurality of nodes within wireless communication range of the first node;
    periodically sending the list of certificate revocation lists to nodes of the plurality of nodes within wireless communication range of the first node, according to the time interval;
    rejecting a request from a third node of the plurality of nodes for access to a resource of the first node, based on a digital certificate of the third node and the digital certificates identified by the certificate revocation lists of the list of certificate revocation lists;
    discarding a certificate revocation list identified on the list of certificate revocation lists and removing the discarded certificate revocation list from the list of certificate revocation lists, according to the respective indication of expiration of each certification revocation list on the list of certificate revocation lists; and
    adjusting the time interval based on a number of certificate revocation lists on the list of certificate revocation lists.

2. The method according to claim 1, wherein the method further comprises:
    receiving, from a certificate authority of the wireless network, an alert identifying a certificate revocation list identifying at least one revoked digital certificate.

3. The method according to claim 1, wherein the plurality of nodes comprises one or more fixed nodes at respective fixed physical locations and one or more mobile nodes that are mobile within a service area of the wireless network.

4. The method according to claim 1, wherein one or more nodes of the plurality of nodes comprise mobile access point functionality configured to provide radio frequency wireless Internet service by the wireless network to one or more end-user devices.

5. The method according to claim 1, wherein one or more nodes of the plurality of nodes comprise interface functionality configured to communicate with a system of an autonomous vehicle.

6. A non-transitory computer-readable medium on which is stored a number of code sections, each code section comprising a plurality of instructions executable by one or more processors to cause the one or more processor to perform the steps of a method of managing digital certificates in nodes of a wireless network comprising a plurality of nodes, the steps of the method comprising:
    receiving, at a first node of the plurality of nodes from a second node of the plurality of nodes, a notification comprising information identify one or more certificate revocation lists, wherein each certificate revocation list identifies one or more digital certificates that have been revoked, wherein each digital certificate prior to revocation authorizes access to a service supported by the wireless network, and wherein each certificate revocation list comprises a respective indication of one or both of a date and a time of expiration;
    adding to a list of certificate revocation lists maintained by the first node, the information identifying those of the one or more certificate revocation lists not already present on the list of certificate revocation lists;
    adjusting a time interval based on a number of nodes of the plurality of nodes within wireless communication range of the first node;
    periodically sending the list of certificate revocation lists to nodes of the plurality of nodes within wireless communication range of the first node, according to the time interval;
    rejecting a request from a third node of the plurality of nodes for access to a resource of the first node, based on a digital certificate of the third node and the digital certificates identified by the certificate revocation lists of the list of certificate revocation lists;
    discarding a certificate revocation list identified on the list of certificate revocation lists and removing the discarded certificate revocation list from the list of certificate revocation lists, according to the respective indication of expiration of each certification revocation list on the list of certificate revocation lists; and
    adjusting the time interval based on a number of certificate revocation lists on the list of certificate revocation lists.

7. The non-transitory computer-readable medium according to claim 6, wherein the steps of the method further comprise:
    receiving, from a certificate authority of the wireless network, an alert identifying a certificate revocation list identifying at least one revoked digital certificate.

8. The non-transitory computer-readable medium according to claim 6, wherein the plurality of nodes comprises one or more fixed nodes at respective fixed physical locations and one or more mobile nodes that are mobile within a service area of the wireless network.

9. The non-transitory computer-readable medium according to claim 6, wherein one or more nodes of the plurality of nodes comprise mobile access point functionality configured to provide radio frequency wireless Internet service by the wireless network to one or more end-user devices.

10. The non-transitory computer-readable medium according to claim 6, wherein one or more nodes of the plurality of nodes comprise interface functionality configured to communicate with a system of an autonomous vehicle.

11. A system for managing digital certificates in nodes of a wireless network comprising a plurality of nodes, the system comprising:
at a first node of the plurality of nodes, one or more processors operably coupled to storage for storing a list of certificate revocation lists and to one or more wireless communication interfaces for communication with other nodes of the plurality of nodes, the one or more processors operable to, at least:
receive, at a first node of the plurality of nodes from a second node of the plurality of nodes, a notification comprising information identify one or more certificate revocation lists, wherein each certificate revocation list identifies one or more digital certificates that have been revoked, wherein each digital certificate prior to revocation authorizes access to a service supported by the wireless network, and wherein each certificate revocation list comprises a respective indication of one or both of a date and a time of expiration;
add to a list of certificate revocation lists maintained by the first node, the information identifying those of the one or more certificate revocation lists not already present on the list of certificate revocation lists;
adjust a time interval based on a number of nodes of the plurality of nodes within wireless communication range of the first node;
periodically send the list of certificate revocation lists to nodes of the plurality of nodes within wireless communication range of the first node, according to the time interval;
reject a request from a third node of the plurality of nodes for access to a resource of the first node, based on a digital certificate of the third node and the digital certificates identified by the certificate revocation lists of the list of certificate revocation lists;
discard a certificate revocation list identified on the list of certificate revocation lists and remove the discarded certificate revocation list from the list of certificate revocation lists, according to the respective indication of expiration of each certification revocation list on the list of certificate revocation lists; and
adjust the time interval based on a number of certificate revocation lists on the list of certificate revocation lists.

12. The system according to claim 11, wherein the one or more processors are further operable to:
receive, from a certificate authority of the wireless network, an alert identifying a certificate revocation list identifying at least one revoked digital certificate.

13. The system according to claim 11, wherein the plurality of nodes comprises one or more fixed nodes at respective fixed physical locations and one or more mobile nodes that are mobile within a service area of the wireless network.

14. The system according to claim 11, wherein one or more nodes of the plurality of nodes comprise mobile access point functionality configured to provide radio frequency wireless Internet service by the wireless network to one or more end-user devices.

15. The system according to claim 11, wherein one or more nodes of the plurality of nodes comprise interface functionality configured to communicate with a system of an autonomous vehicle.

* * * * *